(12) United States Patent
Sugaya et al.

(10) Patent No.: US 12,010,748 B2
(45) Date of Patent: Jun. 11, 2024

(54) COMMUNICATION DEVICE, COMMUNICATION CONTROL DEVICE, COMMUNICATION METHOD, AND COMMUNICATION CONTROL METHOD

(71) Applicant: SONY GROUP CORPORATION, Tokyo (JP)

(72) Inventors: Shigeru Sugaya, Tokyo (JP); Kosuke Aio, Tokyo (JP); Yusuke Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 138 days.

(21) Appl. No.: 17/423,651

(22) PCT Filed: Nov. 11, 2019

(86) PCT No.: PCT/JP2019/046034
§ 371 (c)(1),
(2) Date: Jul. 16, 2021

(87) PCT Pub. No.: WO2020/152973
PCT Pub. Date: Jul. 30, 2020

(65) Prior Publication Data
US 2022/0159759 A1 May 19, 2022

(30) Foreign Application Priority Data

Jan. 24, 2019 (JP) .................. 2019-010696

(51) Int. Cl.
*H04W 56/00* (2009.01)
*H04L 5/00* (2006.01)
(Continued)

(52) U.S. Cl.
CPC .......... *H04W 76/15* (2018.02); *H04L 5/0023* (2013.01); *H04L 5/0035* (2013.01);
(Continued)

(58) Field of Classification Search
None
See application file for complete search history.

(56) References Cited

U.S. PATENT DOCUMENTS

2013/0265955 A1* 10/2013 Kim ............... H04W 72/04
370/329
2014/0269544 A1 9/2014 Zhu
(Continued)

FOREIGN PATENT DOCUMENTS

| CN | 104272808 A | 1/2015 |
| CN | 105101297 A | 11/2015 |

(Continued)

OTHER PUBLICATIONS

International Search Report and Written Opinion of PCT Application No. PCT/JP2019/046034, dated Feb. 4, 2020, 11 pages of ISRWO.

(Continued)

*Primary Examiner* — Sithu Ko
(74) *Attorney, Agent, or Firm* — CHIP LAW GROUP

(57) ABSTRACT

To provide a communication apparatus that realizes data sharing and coordinate transmit of shared data. A communication apparatus that operates as an access point includes: a communicating unit configured to transmit and receive wireless signals; and a control unit configured to control communication operations in the communicating unit, the communication operations including a communication operation for sharing data to be simultaneously transmitted to a single communication terminal between adjacent access points and a communication operation for recognizing that sharing of the data has been completed. The control unit is configured to perform control when transmitting the shared data simultaneously with the adjacent access points so as to multiplex the shared data with a transmission stream (Continued)

addressed to another communication apparatus and transmit the shared data as a multi-user multiplexed stream.

17 Claims, 27 Drawing Sheets

(51) Int. Cl.
*H04W 72/541* (2023.01)
*H04W 74/04* (2009.01)
*H04W 76/15* (2018.01)

(52) U.S. Cl.
CPC ......... *H04L 5/0044* (2013.01); *H04W 72/541* (2023.01); *H04W 74/04* (2013.01)

(56) References Cited

U.S. PATENT DOCUMENTS

| | | | | |
|---|---|---|---|---|
| 2014/0362840 | A1* | 12/2014 | Wong | H04L 1/0003 370/338 |
| 2015/0181561 | A1 | 6/2015 | Oh | |
| 2016/0149671 | A1* | 5/2016 | Yang | H04B 7/0452 370/216 |
| 2018/0324607 | A1* | 11/2018 | Rengarajan | H04W 24/02 |
| 2019/0045366 | A1* | 2/2019 | Vermani | H04B 7/0626 |
| 2019/0141749 | A1* | 5/2019 | Seok | H04W 72/0473 |
| 2020/0137704 | A1* | 4/2020 | Vermani | H04L 5/0035 |
| 2020/0177241 | A1* | 6/2020 | Song | H04B 7/0854 |
| 2020/0374870 | A1* | 11/2020 | Guo | H04W 28/16 |
| 2021/0307099 | A1* | 9/2021 | Ryu | H04W 76/15 |
| 2021/0385779 | A1* | 12/2021 | Oteri | H04W 60/04 |
| 2022/0124507 | A1* | 4/2022 | Ryu | H04L 27/26 |

FOREIGN PATENT DOCUMENTS

| | | |
|---|---|---|
| CN | 105393483 A | 3/2016 |
| JP | 2017-085656 A | 5/2017 |
| WO | 2010/113214 A1 | 10/2010 |

OTHER PUBLICATIONS

Ryu, et al., "Consideration on Multi-AP Coordination for EHT", LG Electronics, IEEE 802.11-18/1982r1, Jan. 9, 2019, 10 pages.

Wang, et al., "ACK Protection Schemes for the IEEE 802.11ac MU-MIMO Downlink", IEEE 802.11-10/0765r0, Jul. 12, 2010, 20 pages.

Liu, et al., "Discussions on Multi-AP Coordination", Mediatek, IEEE 802.11-18/1509r0, Sep. 2018, 07 pages.

Sigurd Schelstrate "Joint Beamforming scenario", IEEE 802.11-19/0092, Jan. 11, 2019, 16 pgs.

* cited by examiner

Fig. 7

| PLCP Header | Frame Control | Duration | Receive Address | Transmit Address | ... | Coordinate Transmission Information Element | ... | FCS |

Association Request / Response Frame

Fig. 10

Grant Frame: PLCP Header | Frame Control | Duration | Receive Address | Transmit Address | Target Address | Coordinate Multiplex | Coordinate Responses | BA Control | BA Info | FCS

Fig. 13

| PH  | S-MPDU |
|-----|--------|
| SD1 | MPDU 1 |
| SD2 | MPDU 2 |
| SD3 | MPDU 3 |
| SD4 | MPDU 4 |

Fig. 14

| PH | Data Frame A-MPDU (AP1-STA1, STA3) | | | | | | |
|---|---|---|---|---|---|---|---|
| SD1 | MPDU 1 | MPDU 2 | MPDU 3 | MPDU 4 | | | |
| SD2 | MPDU 1 | MPDU 2 | MPDU 3 | MPDU 4 | MPDU 5 | MPDU 6 | Pad |

Fig. 15

| PH | Data Frame A-MPDU (AP2-STA2, STA3) | | | | | | | | |
|----|---|---|---|---|---|---|---|---|---|
| SD3 | MPDU 1 | | MPDU 2 | | MPDU 3 | | MPDU 4 | | |
| SD4 | MPDU 1 | MPDU 2 | MPDU 3 | MPDU 4 | MPDU 5 | MPDU 6 | MPDU 7 | MPDU 8 | Pad |

Fig. 16

| PH | Data Frame S-MPDU (M-AP)-(AP1, AP2) | | | | | | | |
|---|---|---|---|---|---|---|---|---|
| SD1 | MPDU 1 | | MPDU 2 | | MPDU 3 | | MPDU 4 | |
| SD2 | MPDU 1 | MPDU 2 | MPDU 3 | MPDU 4 | MPDU 5 | MPDU 6 | | Pad |
| SD3 | MPDU 1 | MPDU 2 | MPDU 3 | MPDU 4 | MPDU 5 | MPDU 6 | MPDU 7 | MPDU 8 | Pad |
| SD4 | MPDU 1 | MPDU 2 | MPDU 3 | MPDU 4 | MPDU 5 | MPDU 6 | MPDU 7 | Pad |

Fig. 17

| PH | S-MPDU Frame (M-AP)-(AP1, AP2) | | | |
|---|---|---|---|---|
| SD1 | MPDU 1 | MPDU 2 | MPDU 3 | MPDU 4 |
| SD2 | MPDU 1 | MPDU 2 | MPDU 3 | MPDU 4 |
| SD3 | MPDU 5 | MPDU 6 | Reserved | |
| SD4 | MPDU 1 | MPDU 2 | MPDU 3 | MPDU 4 |
| SD5 | MPDU 5 | MPDU 6 | MPDU 7 | MPDU 8 |
| SD6 | MPDU 1 | MPDU 2 | MPDU 3 | MPDU 4 |
| SD7 | MPDU 5 | MPDU 6 | MPDU 7 | Reserved |
| SD8 | MPDU 1 | MPDU 2 | MPDU 3 | MPDU 4 |

Fig. 18

| PH | Data Frame A-MPDU (3) | | | | | | |
|---|---|---|---|---|---|---|---|
| SD1 | MPDU 1 | | MPDU 2 | | MPDU 3 | | MPDU 4 |
| SD2 | MPDU 1 | MPDU 2 | MPDU 3 | MPDU 4 | MPDU 5 | MPDU 6 | Pad |
| SD3 | MPDU 1 | | MPDU 2 | | MPDU 3 | | MPDU 4 |
| SD4 | MPDU 1 | MPDU 2 | MPDU 3 | MPDU 4 | MPDU 5 | MPDU 6 | Pad |

Fig. 19

| PH | Data Frame A-MPDU (3) | | | | | | | |
|---|---|---|---|---|---|---|---|---|
| SD1 | MPDU 1 | | MPDU 2 | | MPDU 3 | | MPDU 4 | |
| SD2 | MPDU 1 | | MPDU 2 | | MPDU 3 | | MPDU 4 | |
| SD3 | MPDU 1 | MPDU 2 | MPDU 3 | MPDU 4 | MPDU 5 | MPDU 6 | MPDU 7 | MPDU 8 | Pad |
| SD4 | MPDU 1 | MPDU 2 | MPDU 3 | MPDU 4 | MPDU 5 | MPDU 6 | MPDU 7 | MPDU 8 | Pad |

COMMUNICATION DEVICE, COMMUNICATION CONTROL DEVICE, COMMUNICATION METHOD, AND COMMUNICATION CONTROL METHOD

CROSS REFERENCE TO RELATED APPLICATIONS

This application is a U.S. National Phase of International Patent Application No. PCT/JP2019/046034 filed Nov. 25, 2019, which claims priority benefit of Japanese Patent Application No. JP 2019-010696 filed in the Japan Patent Office on Jan. 24, 2019. Each of the above-referenced applications is hereby incorporated herein by reference in its entirety.

TECHNICAL FIELD

The technique disclosed in the present specification relates to a communication apparatus and a communication method for transmitting and receiving wireless signals.

BACKGROUND ART

A technique for spatial division-multiplexing and wirelessly transmitting a plurality of pieces of data using a Multiple Input Multiple Output (MIMO) system is already in practical use. Using this MIMO technique enables, for example, data to be simultaneously transmitted from a single transmission source communication apparatus that operates as an access point to a plurality of reception destination communication apparatuses that operate as communication terminals. Specifically, when the access point is mounted with a plurality of antenna modules and the communication terminals are constituted by a single antenna module, a transmission amount of a downlink can be increased by using a downlink MIMO technique.

On the other hand, a technique for communicating while avoiding interference between adjacent access points by having a plurality of access points operate in coordination is also in practical use. Most recently, a multi-point coordinate transmit technique has been developed for simultaneously transmitting data from a plurality of access points to a single reception destination communication apparatus to acquire data having been successfully received at the reception destination.

For example, a conceivable method involves, in a system where access points are connected to each other via a wired LAN (Local Area Network) such as Ethernet (registered trademark) or other communicating means and the access points are synchronized in advance, access points performing data transmission in coordination. In addition, a wireless communication apparatus has been proposed which integrates a plurality of groups and performs scheduled access in each group (for example, refer to PTL 1).

CITATION LIST

Patent Literature

[PTL 1]
JP 2017-85656 A

SUMMARY

Technical Problem

An object of the technique disclosed in the present specification is to provide a communication apparatus and a communication method capable of suitably realizing data sharing and coordinate transmit of shared data.

Solution to Problem

A first aspect of the technique disclosed in the present specification is a communication apparatus that operates as an access point, the communication apparatus including:

a communicating unit configured to transmit and receive wireless signals; and a control unit configured to control communication operations in the communicating unit, the communication operations including a communication operation for sharing data to be simultaneously transmitted to a single communication terminal between adjacent access points and a communication operation for recognizing that sharing of the data has been completed.

The communicating unit is capable of transmitting and receiving wireless signals in which a plurality of pieces of data are configured as a multiplexed stream. The control unit is configured to perform control when transmitting the shared data simultaneously with the adjacent access points so as to multiplex the shared data with a transmission stream addressed to another communication apparatus and transmit the shared data as a multi-user multiplexed stream. In addition, the control unit controls so as to perform communication by multiplexing data to be shared between the adjacent access points as a multiplexed stream.

In addition, a second aspect of the technique disclosed in the present specification is a communication method in an access point, the communication method including the steps of:

sharing data to be simultaneously transmitted to a single communication terminal between adjacent access points;

recognizing that sharing of the data has been completed; and transmitting the shared data.

In addition, a third aspect of the technique disclosed in the present specification is a communication apparatus that operates as a communication terminal to be connected to an access point, the communication apparatus including:

a communicating unit configured to transmit and receive wireless signals; and a control unit configured to control communication operations in the communicating unit, the communication operations including an operation for recognizing that a same piece of data has been simultaneously transmitted from a plurality of access points based on a reception of a predetermined frame from the access point.

The predetermined frame is a grant frame that includes information related to sharing of the same piece of data between the adjacent access points. The grant frame includes at least one of information related to the communication terminal, information related to the number of multiplexed transmissions when transmitting the data to be shared, and a communication parameter upon transmission of the data to be shared.

In addition, a fourth aspect of the technique disclosed in the present specification is a communication method in a communication terminal to be connected to an access point, the communication method including the steps of:

receiving a predetermined frame from an access point;

recognizing that a same piece of data has been simultaneously transmitted from a plurality of access points based on the received predetermined frame; and receiving the same piece of data that is simultaneously transmitted from the plurality of access points.

Advantageous Effect of Invention

According to the technique disclosed in the present specification, a communication apparatus and a communication method can be provided which are capable of sharing data between access points in a short period of time and efficiently utilizing a wireless transmission path by coordinate transmit of shared data.

It should be noted that the advantageous effects described in the present specification are merely exemplary and that the advantageous effects of the present invention are not limited thereto. In addition, the present invention may further exhibit attendant advantageous effects in addition to the advantageous effects described above.

Other objects, features, and advantages of the technique disclosed in the present specification will become better understood upon consideration of the following detailed description in conjunction with the embodiment to be described later and the accompanying drawings.

BRIEF DESCRIPTION OF DRAWINGS

FIG. 7 is a diagram showing a configuration example of an association frame.

FIG. 10 is a diagram showing a configuration example of a grant frame.

FIG. 13 is a diagram showing a configuration example of a data frame.

FIG. 14 is a diagram showing a configuration example of a data frame.

FIG. 15 is a diagram showing a configuration example of a data frame.

FIG. 16 is a diagram showing a configuration example of a data frame.

FIG. 17 is a diagram showing a configuration example of a data frame.

FIG. 18 is a diagram showing a configuration example of a data frame.

FIG. 19 is a diagram showing a configuration example of a data frame.

DESCRIPTION OF EMBODIMENTS

Hereinafter, an embodiment of the technique disclosed in the present specification will be described in detail with reference to the accompanying drawings.

In the present specification, a technique for optimizing data sharing and coordinate transmit between a plurality of access points will be proposed. Specifically, a technique will be proposed which optimizes data sharing and coordinate transmit by sharing, in advance, data to be transmitted by coordinate transmit between adjacent access points, designating a communication apparatus to be a target of the coordinate transmit with a grant frame for notifying that the data has been shared, and notifying, in advance, that the coordinate transmit is to be performed at a subsequent timing.

In addition, in the present specification, a technique will also be proposed for efficiently utilizing a wireless transmission path when an access point performs coordinate transmit by not only performing communication with respect to one communication apparatus but also multiplexing data addressed to other communication apparatuses using a spatial division multiplex communication technique intended for multiple users.

Furthermore, in the present specification, a technique will also be proposed for utilizing a spatial division multiplex communication technique intended for a single user to share data between access points in a short period of time and to synchronously transmit the data at a predetermined timing after sharing the data.

Figure 1:
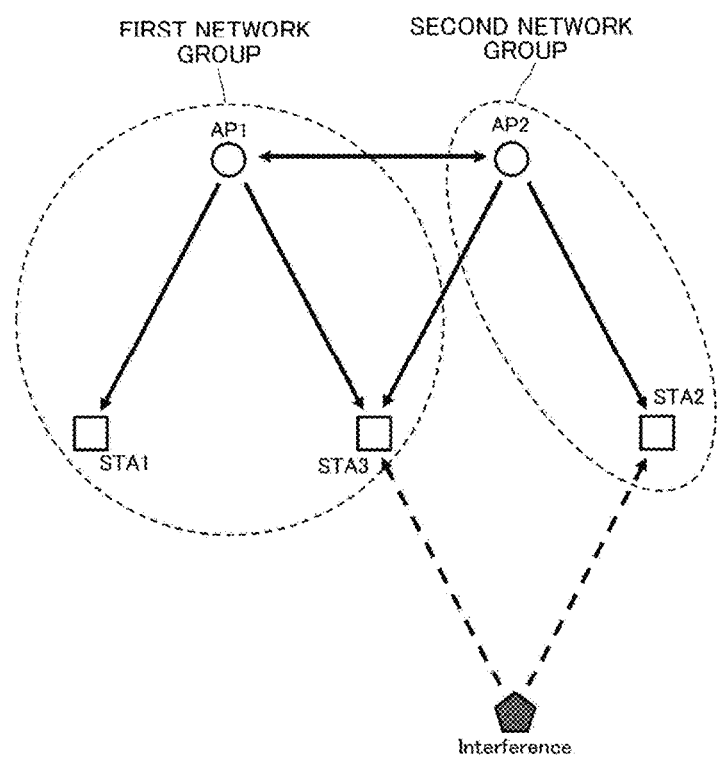
FIG. 1 is a diagram showing a configuration example of a wireless network.

FIG. 1 shows a configuration example of a wireless network to which the technique disclosed in the present specification is applied. The illustrated wireless network is constituted by a first network group and a second network group.

The first network group is constituted by an access point AP1 and communication terminals STA1 and STA3 that are connected to AP1. In addition, the second network group is constituted by an access point AP2 and a communication terminal STA2 that is connected to AP2. In FIG. 1, a range of each network group is enclosed by a dotted line. In addition, transmission signals of the respective access points AP1 and AP2 are indicated by solid arrows.

In this case, it is assumed that the access points AP1 and AP2 of the respective network groups are at positions where the access points AP1 and AP2 can communicate with each other. In addition, it is assumed that the communication terminal STA3 in the first network group is at a location where the communication terminal STA3 and the access point AP2 and the communication terminal STA2 of the second network group can communicate with each other.

Furthermore, in the wireless network shown in FIG. 1, it is assumed that an interference wave from an interference source (Interference) such as another communication system (Other) reaches each of the communication terminal STA3 in the first network group and the communication terminal STA2 in the second network group. In FIG. 1, an interference signal is indicated by a dotted arrow.

Since STA3 is capable of communicating with both AP1 and AP2, STA3 is capable of receiving a same piece of data from the plurality of access points AP1 and AP2. Therefore, if data is being shared between AP1 and AP2, AP1 and AP2 can simultaneously transmit the same piece of data. In addition, by receiving the simultaneously transmitted piece of data, STA3 can more reliably receive the data.

Alternatively, data sharing between the access points AP1 and AP2 may be performed via wired communication such as the Ethernet (registered trademark) instead of via wireless communication.

Figure 2:
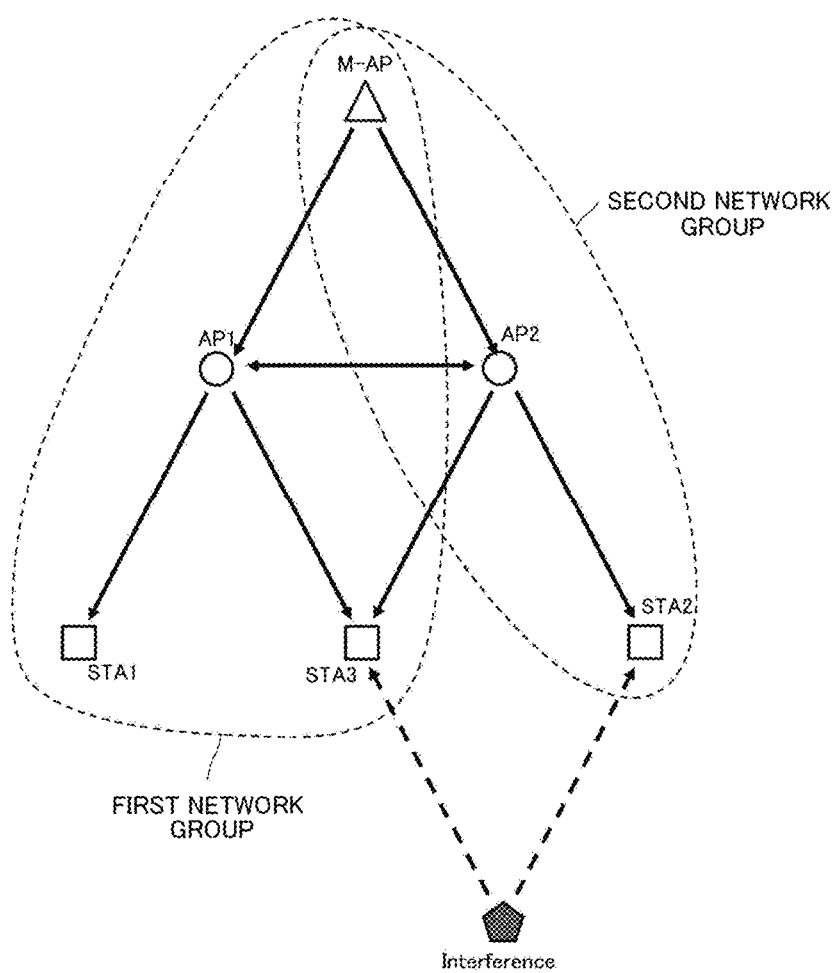
FIG. 2 is a diagram showing another configuration example of a wireless network.

FIG. 2 shows another configuration example of the wireless network to which the technique disclosed in the present specification is applied. The illustrated wireless network is constituted by a first network group and a second network group.

The first network group is constituted by an access point AP1 and communication terminals STA1 and STA3 that are connected to AP1. In addition, the second network group is constituted by an access point AP2 and a communication terminal STA2 that is connected to AP2. The wireless network shown in FIG. 2 further assumes that there is a master access point (M-AP) that supervises both network groups and that there is another communication system that acts as an interference source (Interference). It is assumed that an interference wave from the interference source reaches each of the communication terminal STA3 in the first network group and the communication terminal STA2 in the second network group. In FIG. 2, a range of each network group is enclosed by a dotted line. In addition, transmission signals of the respective access points AP1 and AP2 are indicated by solid arrows and an interference signal is indicated by a dotted arrow.

Since M-AP is capable of communicating with both AP1 and AP2, M-AP is capable of sharing data. Specifically, M-AP is capable of transmitting received data to AP1 and AP2 at high speed and delivering the data to STA3 from both AP1 and AP2 in a coordinated manner. In addition, by receiving the simultaneously transmitted piece of data from AP1 and AP2, STA3 can more reliably receive the data.

Alternatively, data sharing between the access point M-AP and the access points AP1 and AP2 may be performed via wired communication such as the Ethernet (registered trademark) instead of via wireless communication.

Figure 3:
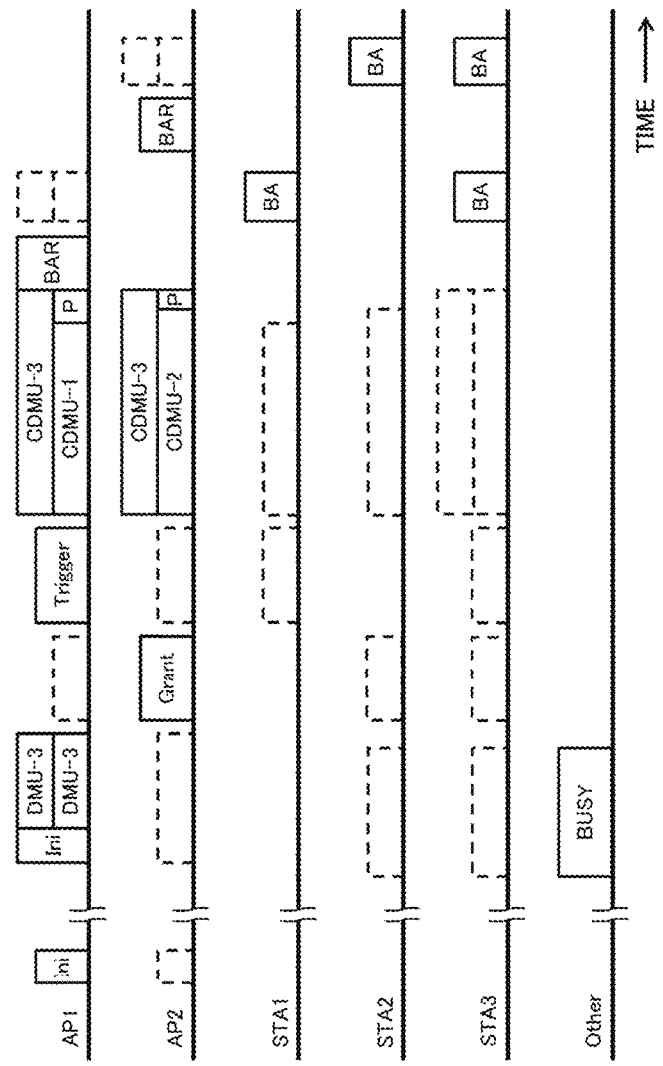
FIG. 3 is a diagram showing a flow of performing data sharing and coordinate transmit of data between a plurality of access points.

FIG. 3 shows a flow of performing data sharing and coordinate transmit of data between a plurality of access points. However, the wireless network configuration shown in FIG. 1 is assumed and an abscissa is adopted as a time axis. A square depicted by a solid line on each abscissa represents a signal (or a frame) that is transmitted by a corresponding communication apparatus during a relevant time section. In addition, a square depicted by a dotted line represents a signal (or a frame) that is received by a corresponding communication apparatus during a relevant time section.

In this case, it is assumed that the access point AP1 actively performs coordinate transmit and the access point AP2 passively performs coordinate transmit. In addition, the communication terminals STA1 and STA3 operate as members belonging to the first network group that is managed by AP1 and the communication terminal STA2 operates as a member belonging to the second network group that is managed by AP2.

In addition, an interference signal from an interference source (Other) such as another communication system arrives at STA2 and STA3. STA2 and STA3 are capable of comprehending a period during which the interference signal arrives as a BUSY state. Therefore, since there is no response during a period in which the interference signal (BUSY) is arriving from the interference source (Other), each of the access points AP1 and AP2 can comprehend that communication to STA2 or STA3 cannot be performed.

In such a situation, the access point AP1 starts initiation (Ini) of data sharing for coordinate transmit to the communication terminal STA3 that is subordinate to AP1 and designates the access point AP2 to be a target.

The initiation for data sharing is started as necessary by the access point that actively performs coordinate transmit. In the example shown in FIG. 3, AP1 has started initiation. The initiation may be started at a timing immediately following a notification performed in advance between both access points AP1 and AP2 or a timing immediately before performing coordinate transmit. Alternatively, the initiation may be transmitted together with shared data when performing coordinate transmit.

Due to the initiation, the access point AP2 that passively performs coordinate transmit subsequently receives data to be shared in accordance with a request from the access point AP1 that actively performs coordinate transmit. For example, using a SU (Single User)-MIMO spatial division multiplex communication technique or a frequency channel bonding technique, data to be transmitted by coordinate transmit is transmitted from AP1 to AP2 and data (DMU-3) addressed to STA3 is shared between AP1 and AP2 in a short period of time.

Note that communication processing for sharing data (DMU-3) addressed to STA3 between AP1 and AP2 can be performed using the BUSY state during which STA2 and STA3 are receiving the interference signal from the interference source (Other). In addition, in the communication of the shared data (DMU-3) from AP1 to AP2, utilizing MCS (Modulation and Coding Sheme) that enables high-speed transmission enables data sharing between access points to be realized in a short period of time.

Upon receiving the shared data from AP1, AP2 sends back a reception confirmation and a grant frame that designates STA3 as a target to receive coordinate transmit to AP1.

The grant frame transmitted from AP2 reaches STA2 and STA3 in addition to AP1. A frame interval between the grant frame and a data frame (to be described later) for transmitting the shared data by coordinate transmit is constant. Therefore, STA2 and STA3 having been able to receive the grant frame are capable of securing synchronization of time between the access points AP1 and AP2 and recognizing that coordinate transmit by surrounding access points is to be performed within a predetermined time.

In addition, AP1 transmits a trigger frame describing various parameters for coordinate transmit to the communication terminals STA1 and STA3 that are subordinate to AP1 and to AP2 that passively performs coordinate transmit. Subsequently, AP1 and AP2 simultaneously perform coordinate transmit of the shared data by matching timings.

The trigger frame transmitted from AP1 reaches STA1 and STA3 in addition to AP2. A frame interval between the trigger frame and an immediately following data frame is constant. Therefore, AP2, STA1, and STA3 having been able to receive the trigger frame can secure detailed (in units of microseconds) synchronization of time with the access point AP1.

In this case, data transmitted from each of the access points AP1 and AP2 can also be subjected to spatial division multiplexing at each access point. In the example shown in FIG. 3, data (CDMU-1) intended for STA1 that is subordinate to AP1 is transmitted from the AP1 side by being multiplexed using a spatial multiplexing technique to data (CDMU-3) intended for STA3 to be shared with AP2. In addition, data (CDMU-2) intended for STA2 that is subordinate to AP2 is transmitted from the AP2 side by being multiplexed using a spatial multiplexing technique with the data (CDMU-3) intended for STA3 to be shared with AP1. In this manner, by having an access point perform spatially multiplexed transmission of data to be transmitted by coordinate transmit with data addressed to other communication terminals, a wireless transmission path can be utilized in an efficient manner.

An access point is configured to transmit pieces of transmission data after making time lengths thereof when performing spatially multiplexed transmission of data to be transmitted by coordinate transmit with data addressed to other communication terminals, and padding (P) is applied to the piece of transmission data with a shorter time length.

In the example shown in FIG. 3, AP1 transmits the pieces of data after applying padding (P) to the data (CDMU-1) intended for STA1 that is shorter than the data (CDMU-3) to be transmitted by coordinate transmit to STA3 and making the time length of CDMU-3 the same. In addition, AP2 transmits the pieces of data after applying padding (P) to the data (CDMU-2) intended for STA2 that is shorter than the data (CDMU-3) to be transmitted by coordinate transmit to STA3 and making the time length of CDMU-3 the same.

The pieces of data transmitted by coordinate transmit by spatial division multiplexing by AP1 and AP2 are received by STA1, STA2, and STA3. In addition, STA1, STA2, and STA3 respectively gather data addressed to themselves and send back reception confirmation in a format of a block ACK (BA). In STA3, reception confirmation is made if any one of CDMU-3 sent from AP1 and CDMU-3 sent from AP2 can be received without error.

A block ACK request (BAR) is transmitted at a different timing for each access point and each communication terminal returns a block ACK at a different timing for each access point. In the example shown in FIG. 3, a block ACK request is transmitted from AP1 at a first timing and an ACK frame to AP1 is sent back from STA1 and STA3. In addition, a block ACK request is transmitted from AP2 at a second timing and an ACK frame to AP2 is sent back from STA2 and STA3.

The ACK frames may be sent back by applying an uplink multi-user MIMO technique or may be sent back as response frames with respect to a predetermined trigger frame.

When AP1 is able to receive all ACK frames sent back from each of STA1 and STA3, AP1 discards all pieces of transmission data CDMU-1 and CDMU-3 being stored in a transmission buffer. In other words, even if one CDMU-3 transmitted from AP1 or AP2 has not arrived correctly, STA3 is considered to have received CDMU-3. In addition, when there is an ACK frame that cannot be received, AP1 starts re-transmission of relevant data. In a similar manner, when AP2 is able to receive all ACK frames sent back from each of STA2 and STA3, AP2 discards all pieces of transmission data CDMU-2 and CDMU-3 being stored in a transmission buffer. In addition, when there is an ACK frame that cannot be received, AP2 starts re-transmission of relevant data.

Figure 4:
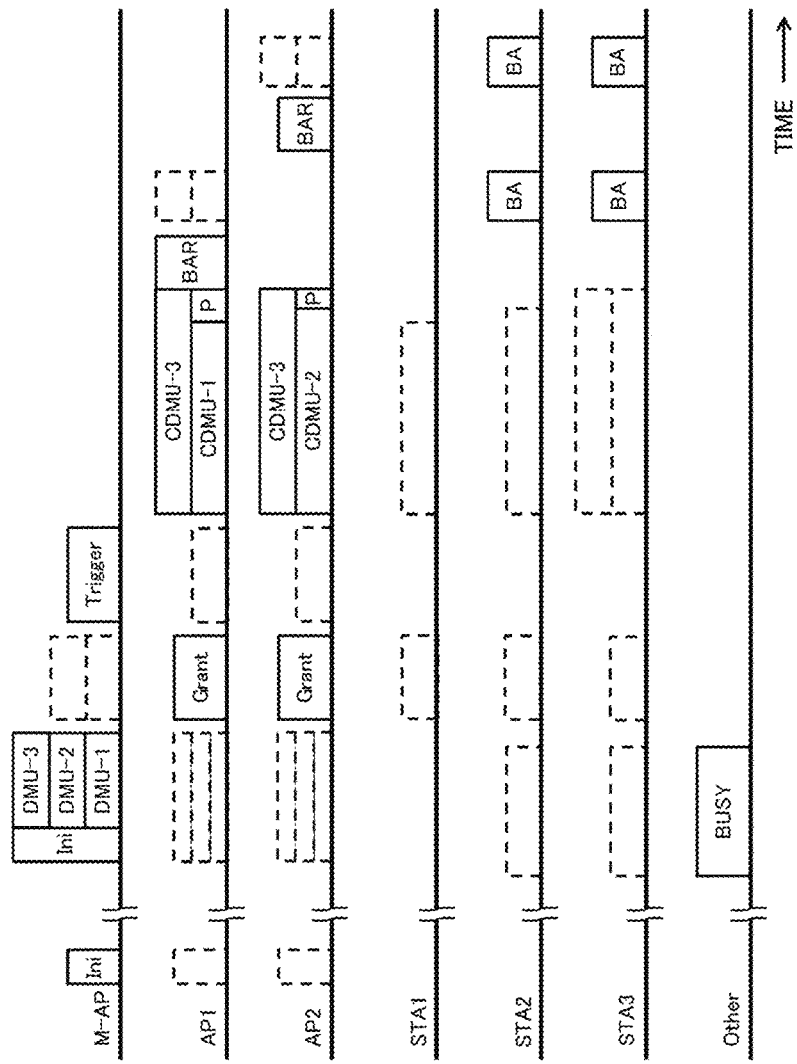
FIG. 4 is a diagram showing a flow of performing data sharing and coordinate transmit of data between a plurality of access points.

FIG. 4 shows a flow of performing data sharing and coordinate transmit of data between a plurality of access points. However, the wireless network configuration shown in FIG. 2 is assumed and an abscissa is adopted as a time axis. A square depicted on each abscissa represents a signal (or a frame) that is transmitted by a corresponding communication apparatus during a relevant time section. In addition, a square depicted by a dotted line represents a signal (or a frame) that is received by a corresponding communication apparatus during a relevant time section.

In this case, it is assumed that there is a master access point (M-AP) that manages coordinate transmit and that the access points AP1 and AP2 of the respective network groups passively perform coordinate transmit under the management of M-AP. In addition, the communication terminals STA1 and STA3 operate as members belonging to the first network group that is managed by AP1 and the communication terminal STA2 operates as a member belonging to the second network group that is managed by AP2.

In addition, an interference signal from an interference source (Other) such as another communication system arrives at STA2 and STA3. STA2 and STA3 are capable of comprehending a period during which the interference signal arrives as a BUSY state. Therefore, each of the access points AP1 and AP2 can comprehend that communication to STA2 or STA3 cannot be performed during a period in which the signal is arriving from the interference source (Other).

In such a situation, the master AP starts initiation (Ini) of data sharing for coordinate transmit and designates the access points AP1 and AP2 to be targets.

The initiation of data sharing is started as necessary by the access point that manages coordinate transmit. In the example shown in FIG. 4, the master AP has started initiation. The initiation may be started at a timing immediately following a notification performed in advance between both access points or a timing immediately before performing coordinate transmit. Alternatively, the initiation may be transmitted together with shared data when performing coordinate transmit.

Due to the initiation, the respective access points AP1 and AP2 that passively perform coordinate transmit subsequently receive data to be shared in accordance with a request from the master AP that manages coordinate transmit. For example, data addressed to each of the communication terminals STA1, STA2, and STA3 is transmitted from the master AP. For example, using a SU-MIMO spatial division multiplex communication technique or a frequency channel bonding technique, data to be transmitted by coordinate transmit is transmitted from the master AP to AP1 and AP2 and data (DMU-3) addressed to STA3 is shared between AP1 and AP2 in a short period of time. In addition, data (DMU-1) addressed to STA1 is transmitted from the master AP to AP1 and data (DMU-2) addressed to STA2 is transmitted from the master AP to AP2. Furthermore, the pieces of data are to be transmitted from AP1 and AP2 to the respective communication terminals STA1, STA2, and STA3 by applying a MU-MIMO technique (to be described later).

Note that communication processing for sharing data (DMU-3) addressed to STA3 between the master AP and AP1 and AP2 can be performed using the BUSY state during which STA2 and STA3 are receiving the interference signal from the interference source (Other). In addition, in the communication of the shared data (DMU-3) from the master AP to AP1 and AP2, utilizing MCS that enables high-speed transmission enables data sharing between the access points to be realized in a short period of time.

Upon receiving the shared data from the master AP, AP1 and AP2 respectively send back a reception confirmation and a grant frame that designates STA3 to receive coordinate transmit as a target to the master AP. While AP1 and AP2 send back the grant frame simultaneously in this case, a configuration is adopted in which the grant frame is transmitted using uplink multi-user MIMO spatial division multiplexing or the like.

The grant frame transmitted from AP1 reaches AP2, STA1, and STA3 in addition to the master AP, and the grant frame transmitted from AP2 reaches AP1, STA2, and STA3 in addition to the master AP. A frame interval between the grant frame and a data frame (to be described later) for transmitting the shared data by coordinate transmit is constant. Therefore, STA2 and STA3 having been able to receive the grant frame are capable of securing synchronization of time between the master AP, AP1, and AP2 and are capable of recognizing that coordinate transmit by surrounding access points is to be performed within a predetermined time.

In addition, the master AP transmits a trigger frame describing various parameters for coordinate transmit to AP1 and AP2. Subsequently, AP1 and AP2 simultaneously perform coordinate transmit of the shared data by matching timings. A frame interval between the trigger frame and an immediately following data frame is constant. Therefore, AP1 and AP2 having been able to receive the trigger frame can secure detailed (in units of microseconds) synchronization of time with the master AP.

In this case, data transmitted from each of the access points AP1 and AP2 can also be subjected to spatial division multiplexing at each access point. In the example shown in FIG. 4, data to be transmitted from AP1 is transmitted by being multiplexed with data (CDMU-1) intended for STA1 and data (CDMU-3) intended for STA3. In addition, data to be transmitted from AP2 is transmitted by being multiplexed with data (CDMU-2) intended for STA2 and data (CDMU-3) intended for STA3. In this manner, by having an access point perform spatially multiplexed transmission of data to be transmitted by coordinate transmit with data addressed to other communication terminals, a wireless transmission path can be utilized in an efficient manner.

An access point is configured to transmit pieces of transmission data after making time lengths thereof uniform when performing spatially multiplexed transmission of data to be transmitted by coordinate transmit with data addressed to other communication terminals, and padding (P) is applied to the piece of transmission data with a shorter time length. In the example shown in FIG. 4, AP1 transmits the pieces of data after applying padding (P) to the data (CDMU-1) intended for STA1 that is shorter than the data (CDMU-3) to be transmitted by coordinate transmit to STA3 and making the time length of CDMU-3 the same. In addition, AP2 transmits the pieces of data after applying padding (P) to the data (CDMU-2) intended for STA2 that is shorter than the data (CDMU-3) to be transmitted by coordinate transmit to STA3 and making the time length of CDMU-3 the same.

The pieces of data transmitted by coordinate transmit by spatial division multiplexing by AP1 and AP2 are received by STA1, STA2, and STA3. In addition, STA1, STA2, and STA3 respectively gather data addressed to themselves and send back reception confirmation in the format of block ACK (BA). In STA3, reception confirmation is made if any one of CDMU-3 sent from AP1 and CDMU-3 sent from AP2 can be received without error.

A block ACK request (BAR) is transmitted at a different timing for each access point and each communication terminal returns a block ACK at a different timing for each access point. In other words, even if one CDMU-3 transmitted from AP1 or AP2 has not arrived correctly, STA3 is considered to have received CDMU-3. In the example shown in FIG. 4, a block ACK request is transmitted from AP1 at a first timing and an ACK frame to AP1 is sent back from STA1 and STA3. In addition, a block ACK request is transmitted from AP2 at a second timing and an ACK frame to AP2 is sent back from STA2 and STA3.

The ACK frames may be sent back by applying an uplink multi-user MIMO technique or may be sent back as response frames with respect to a predetermined trigger frame.

When AP1 is able to receive all ACK frames sent back from each of STA1 and STA3, AP1 discards all pieces of transmission data CDMU-1 and CDMU-3 being stored in a transmission buffer. In addition, when there is an ACK frame that cannot be received, AP1 starts re-transmission of relevant data. In a similar manner, when AP2 is able to receive all ACK frames sent back from each of STA2 and STA3, AP2 discards all pieces of transmission data CDMU-2 and CDMU-3 being stored in a transmission buffer. In addition, when there is an ACK frame that cannot be received, AP2 starts re-transmission of relevant data.

Although omitted in FIGS. 2 and 4, it is also assumed that M-AP also manages a wireless network, there is one or a plurality of subordinate communication terminals, and data to be transmitted by coordinate transmit is transmitted by spatially multiplexed transmission with data addressed to other communication terminals in a similar manner to AP1 and AP2.

Figure 5:
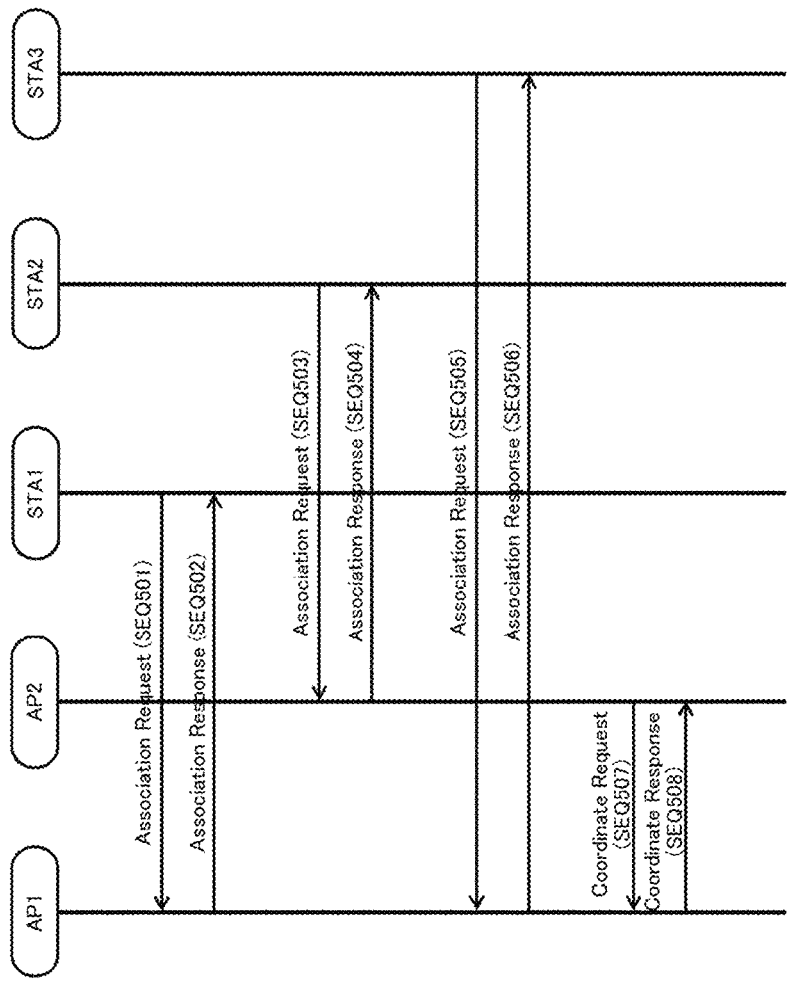
FIG. 5 is a diagram showing a communication sequence example of performing operation confirmation for realizing coordinate transmit.

FIG. 5 shows a communication sequence example of performing operation confirmation for realizing coordinate transmit of data by a plurality of access points.

However, in FIG. 5, it is assumed that the access point AP1 that actively performs coordinate transmit, the access point AP2 that passively performs coordinate transmit, the communication terminals STA1 and STA3 that belong to the network of AP1, and the communication terminal STA2 that belongs to the network of AP2 are respectively operating as in the wireless network shown in FIG. 1.

First, an association request is transmitted from STA1 to AP1 (SEQ501). In addition, when permitting association by STA1 to a host network of AP1, AP1 sends back an association response to STA1 (SEQ502).

In a similar manner, an association request is transmitted from STA2 to AP2 (SEQ503). In addition, when permitting association by STA2 to a host network of AP2, AP2 sends back an association response to STA2 (SEQ504).

Furthermore, an association request is transmitted from STA3 to AP1 (SEQ505). In addition, when permitting association by STA3 to a host network of AP1, AP1 sends back an association response to STA3 (SEQ506).

In this case, the respective communication terminals STA1, STA2, and STA3 are configured to perform an information exchange including a coordinate transmit information element that describes a spatial division multiplex parameter that can be received by the communication terminal itself when performing the association procedure described above with the access point AP1 or AP2. The coordinate transmit information element includes the number of transmission multiplexes and the number of reception multiplexes of the communication apparatus (to be described later). Therefore, AP1 is capable of comprehending the number of spatially multiplexed streams that can be respectively received by STA1 and STA3 that are subordinate to AP1. In a similar manner, AP2 is capable of comprehending the number of spatially multiplexed streams that can be received by STA2 that is subordinate to AP2.

Furthermore, for example, when AP1 and AP2 comprehend that AP1 and AP2 are present at locations that enable AP1 and AP2 to communicate with each other, by exchanging a coordinate request and a coordinate response that are constituted by the coordinate transmit information element (SEQ507 and SEQ508), AP1 and AP2 comprehend that it is possible to perform coordinate transmit of communication to a communication terminal of which presence can be comprehended at both access points. In addition, AP1 is capable of comprehending the number of spatially multiplexed streams in the wireless network of AP2 and AP2 is capable of comprehending the number of spatially multiplexed streams that can be received by STA1 and STA3 in the wireless network of AP1.

Figure 6:
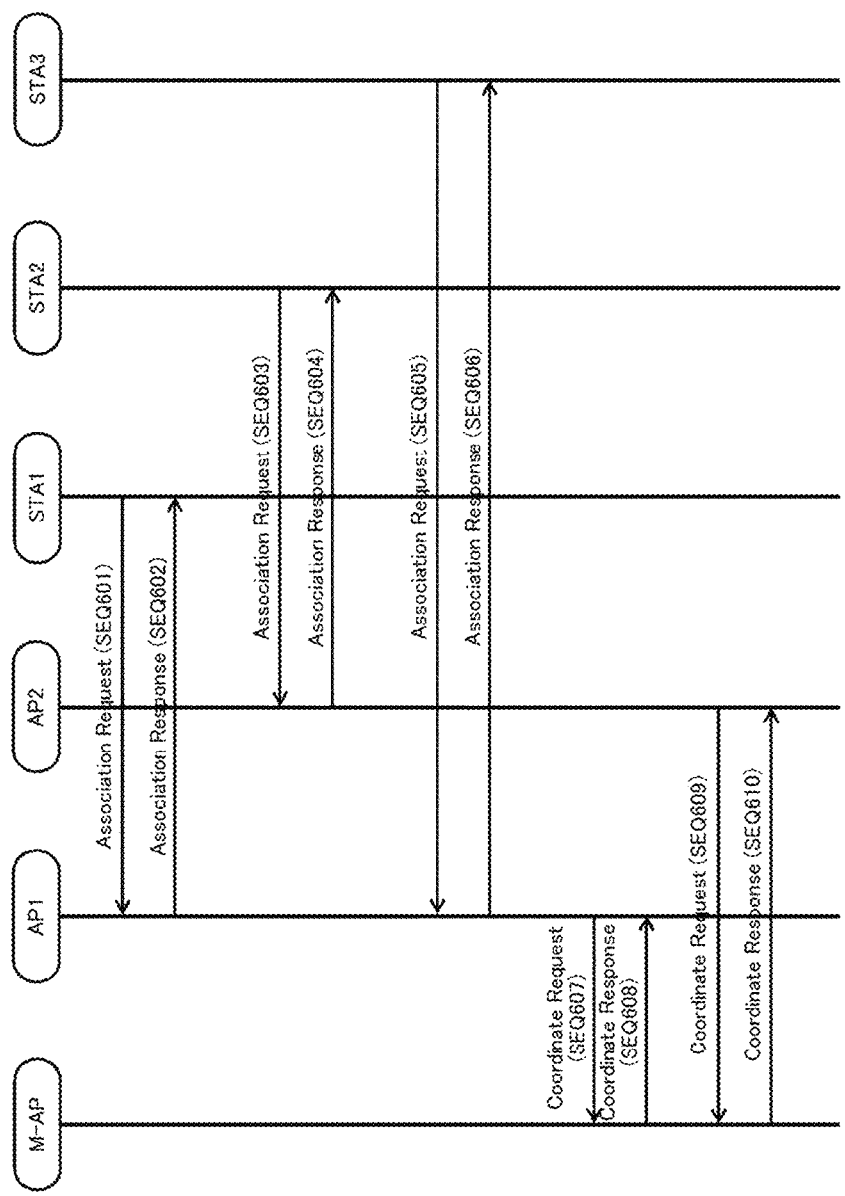
FIG. 6 is a diagram showing a communication sequence example of performing operation confirmation for realizing coordinate transmit.

FIG. 6 shows another communication sequence example of performing operation confirmation for realizing coordinate transmit of data by a plurality of access points.

However, in FIG. 6, it is assumed that the master AP access point (M-AP) that manages coordinate transmit, the access points AP1 and AP2 that passively perform coordinate transmit, the communication terminals STA1 and STA3 that belong to the network of AP1, and the communication terminal STA2 that belongs to the network of AP2 are respectively operating as in the wireless network shown in FIG. 2.

First, an association request is transmitted from STA1 to AP1 (SEQ601). In addition, when permitting association by STA1 to a host network of AP1, AP1 sends back an association response to STA1 (SEQ602). In a similar manner, an association request is transmitted from STA2 to AP2 (SEQ603). In addition, when permitting association by STA2 to a host network of AP2, AP2 sends back an association response to STA2 (SEQ604). Furthermore, an association request is transmitted from STA3 to AP1 (SEQ605). In addition, when permitting association by STA3 to a host network of AP1, AP1 sends back an association response to STA3 (SEQ606).

In this case, the respective communication terminals STA1, STA2, and STA3 perform an information exchange including a coordinate transmit information element that describes a spatial division multiplex parameter that can be received by the communication terminal itself when performing the association procedure described above with the access point AP1 or AP2. Therefore, AP1 is capable of comprehending the number of spatially multiplexed streams that can be respectively received by STA1 and STA3 that are subordinate to AP1. In a similar manner, AP2 is capable of comprehending the number of spatially multiplexed streams that can be received by STA2 that is subordinate to AP2.

Furthermore, when M-AP comprehends that M-AP and AP1 are present at locations that enable M-AP and AP1 to communicate with each other, M-AP exchanges a coordinate request and a coordinate response that are constituted by the coordinate transmit information element (SEQ607 and SEQ608). In addition, when M-AP comprehends that M-AP and AP2 are present at locations that enable M-AP and AP2 to communicate with each other, M-AP exchanges a coordinate request and a coordinate response that are constituted by the coordinate transmit information element (SEQ609 and SEQ610). Accordingly, M-AP comprehends that coordinate transmit of communication to a communication terminal of which presence can be comprehended at both access points AP1 and AP2 can be performed. In addition, the M-AP can comprehend the number of spatially multiplexed streams in each wireless network of AP1 and AP2.

FIG. 7 shows a configuration example of an association frame. However, it is assumed that an association frame hereby referred to includes both an association request frame and an association response frame. In addition, a field that is particularly characteristic in the present embodiment is grayed out.

The illustrated association frame is configured as a management frame in a MAC (Media Access Control) layer that follows a PLCP (Physical Layer Convergence Protocol) header as a preamble in a predetermined PHY layer. In other words, as a conventional association frame structure, the association frame includes fields such as Frame Control that indicates a type of the frame, Duration that indicates a duration of the frame, Receive Address that indicates an address of a reception destination, and Transmit Address that indicates an address of a transmission source. In addition, following these conventional fields, the association frame includes a coordinate transmit information element, and a frame check sequence (FCS) having been calculated according to a predetermined calculation procedure from the entire frame is added to an end of the association frame. A structure of the coordinate transmit information element will be described later (refer to FIG. 8).

Figure 8:
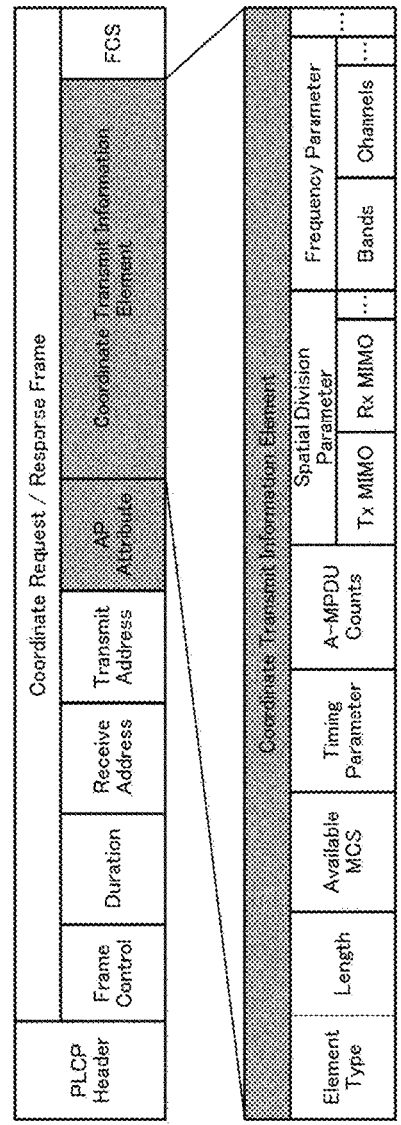
FIG. 8 is a diagram showing a configuration example of a coordination frame.

FIG. 8 shows a configuration example of a coordination frame. However, it is assumed that a coordination frame hereby referred to includes both a coordination request frame and a coordination response frame. In addition, a field that is particularly characteristic in the present embodiment is grayed out.

The illustrated coordination frame is configured as a management frame in a MAC layer that follows a PLCP header as a preamble in a predetermined PHY layer. In other words, the coordination frame includes fields such as Frame Control that indicates a type of the frame, Duration that indicates a duration of the frame, Receive Address that indicates an address of a reception destination, and Transmit Address that indicates an address of a transmission source. In addition, following these fields, the coordination frame includes an AP Attribute that indicates an attribute of an access point and a coordinate transmit information element, and a frame check sequence (FCS) is added to an end of the coordination frame.

The coordinate transmit information element includes parameters such as Element Type that indicates a format of an information element, Length that indicates an information length, Available MCS that indicates an available modulation scheme and an available coding scheme, Timing Parameter that indicates a parameter of a transmission timing, and A-MPDU (Aggregation MPDU) Counts that indicates the number of MPDU (MAC Protocol Data Init) to be aggregated.

In addition, as Spatial Division Parameters, the coordinate transmit information element further includes parameters such as the number of transmission multiplexes Tx MIMO and the number of reception multiplexes Rx MIMO.

Furthermore, as Frequency Parameters, the coordinate transmit information element further includes parameters such as Bands that indicates an available bandwidth and Channels that indicates the number of available channels.

It should be noted that various parameters other than those shown in FIG. 8 may be set as necessary to the coordinate transmit information element in the coordination frame.

Figure 9:
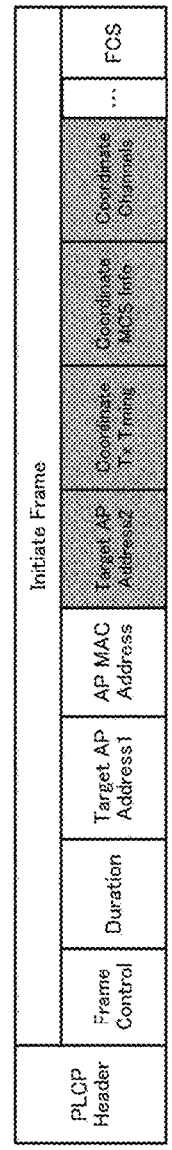
FIG. 9 is a diagram showing a configuration example of an initiate frame.

FIG. 9 shows a configuration example of an initiate frame. However, a field that is particularly characteristic in the present embodiment is grayed out. The initiate frame is used by an access point that actively performs coordinate transmit or a master access point that manages coordinate transmit upon initiation of data sharing for performing coordinate transmit to a communication terminal (for example, refer to FIGS. 3 and 4).

The illustrated initiate frame is configured as a control frame in a MAC layer that follows a PLCP header as a preamble in a predetermined PHY layer. In other words, as a conventional control frame structure, the initiate frame includes fields such as Frame Control that indicates a type of the frame, Duration that indicates a duration of the frame, Target AP Address1 that indicates an address of a target access point, and AP MAC Address that indicates an address of a transmission source access point, and further includes Targer Ap Address2 that indicates an address of a second target access point if necessary.

The target access point hereby referred to is an access point that is designated as a partner of coordinate transmit by the access point that actively performs coordinate transmit or the master access point that manages coordinate transmit. Basically, the target access point is an access point that passively performs coordinate transmit. The second target access point is, for example, a second target access point to be designated by the master access point. Based on the examples shown in FIGS. 2 and 4, M-AP is expected to designate AP1 as the first target access point and designate AP2 as the second target access point. When performing coordinate transmit using three or more access points, the initiate frame is to be provided with fields for storing Targer AP Address3 that indicates an address of a third target access point, and so on.

In addition, following these fields, the initiate frame further includes parameters such as Coordinate Tx Timing that indicates a timing of coordinate transmit, Coordinate MCS Info that indicates a modulation scheme and a code rate when performing coordinate transmit, and Coordinate Channels that indicates channels to be transmitted by coordinate transmit, and a frame check sequence (FCS) is added to an end of the initiate frame.

FIG. 10 shows a configuration example of a grant frame. However, a field that is particularly characteristic in the present embodiment is grayed out. The grant frame is used by an access point that passively performs coordinate transmit upon reception confirmation of shared data (for example, refer to FIGS. 3 and 4).

The illustrated grant frame is configured as a control frame in a MAC layer that follows a PLCP header as a preamble in a predetermined PHY layer. In other words, as a conventional control frame structure, the grant frame includes fields such as Frame Control that indicates a type of the frame, Duration that indicates a duration of the frame, Receive Address that indicates an address of a reception destination, and Transmit Address that indicates an address of a transmission source. In addition, following these fields, the grant frame further includes parameters such as Target Address that indicates a communication terminal to be a target of coordinate transmit, Coordinate Multiplex that represents the number of coordinate multiplexed transmissions, Coordinate Parameter that represents a parameter when performing coordinate transmit, and BA Control and BA Information that are block ACK information of a frame having been received as shared data, and a frame check sequence (FCS) is added to an end of the grant frame. Various communication parameters such as an MCS, transmission power, and a guard interval length that are used when performing coordinate transmit are described in Coordinate Parameter.

It is to be understood that designating a communication terminal to receive coordinate transmit data by describing information related to a communication terminal to be a reception target of coordinate transmit in the grant frame enables the reception terminal to comprehend in advance that coordinate transmit is to be executed.

Figure 11:
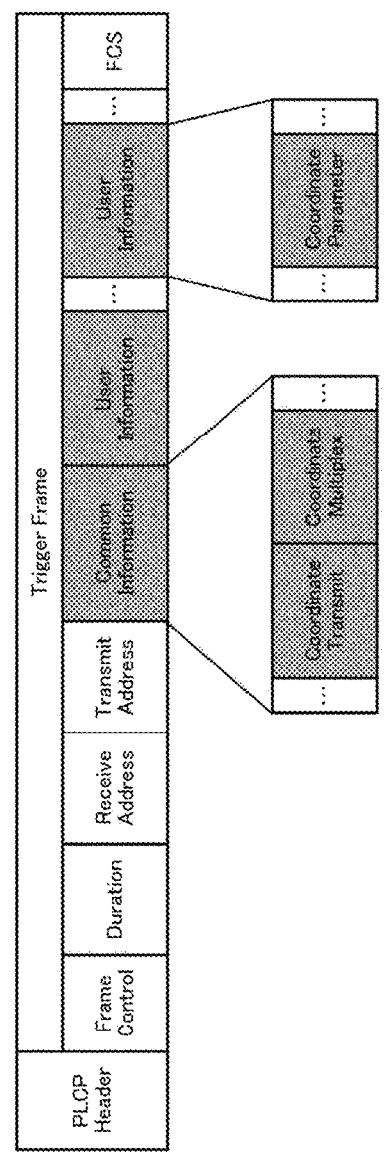
FIG. 11 is a diagram showing a configuration example of a trigger frame.

FIG. 11 shows a configuration example of a trigger frame. However, a field that is particularly characteristic in the present embodiment is grayed out. The trigger frame is used by an access point that actively performs coordinate transmit or a master access point that manages coordinate transmit in order to match a detailed (in units of microseconds) timing of coordinate transmit with an access point that passively performs coordinate transmit (for example, refer to FIGS. 3 and 4).

The illustrated trigger frame is configured as a control frame in a MAC layer that follows a PLCP header as a preamble in a predetermined PHY layer. In other words, as a conventional control frame structure, the trigger frame includes fields such as Frame Control that indicates a type of the frame, Duration that indicates a duration of the frame, Receive Address that indicates an address of a reception destination, and Transmit Address that indicates an address of a transmission source. In addition, following these fields, Common Information that is shared by all reception destinations and User Information that is information necessary for each user (each communication apparatus to be a reception destination) are added as necessary, and a frame check sequence (FCS) is added to an end of the trigger frame.

As Common Information, respective bits of Coordinate Transmit that indicates that coordinate transmit is to be performed and Coordinate Multiplex that indicates that the communication is multiplexed communication as well as coordinate transmit are prepared.

In addition, as User Information that is information necessary for each user, Coordinate Parameter that represents a transmission parameter for each user necessary when performing coordinate transmit is described. Various communication parameters such as an MCS, transmission power, and a guard interval length that are used when performing coordinate transmit are described in Coordinate Parameter.

Figure 12:
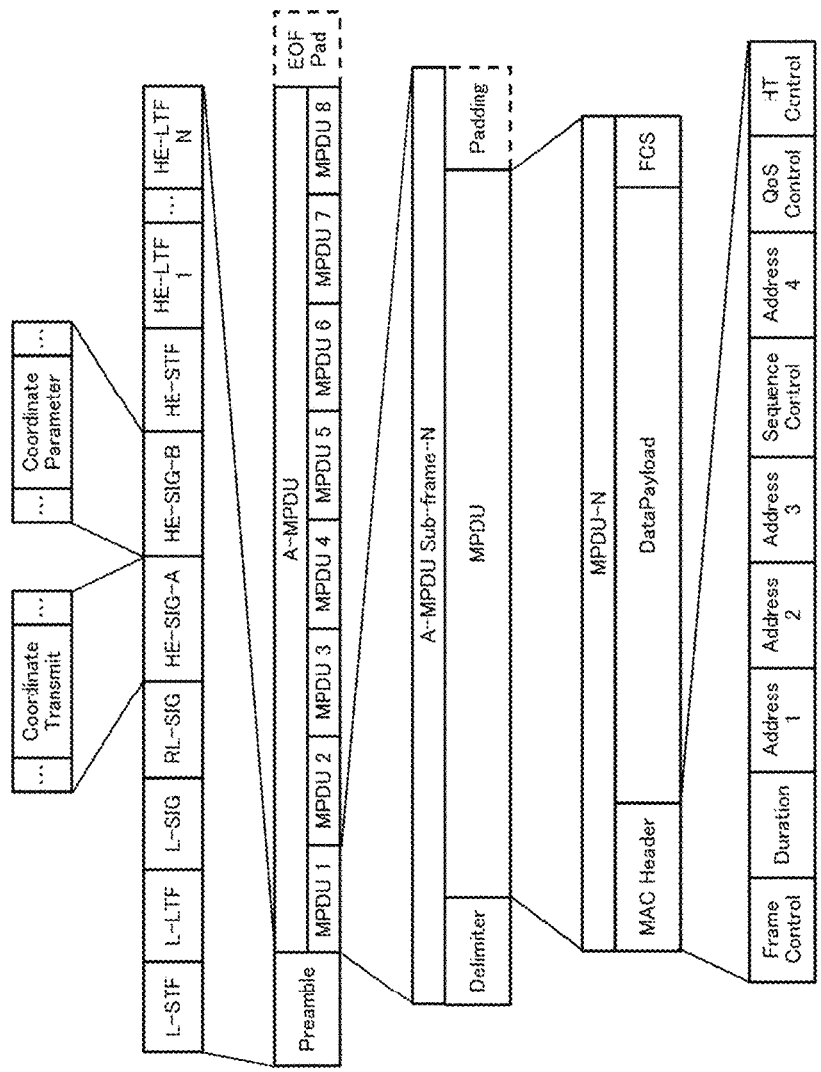
FIG. 12 is a diagram showing an internal structure of a data frame.

FIG. 12 shows an internal structure of a data frame. The illustrated data frame is assumed to be configured as an A-MPDU frame that aggregates a plurality of subframes (MPDU).

A Preamble of the illustrated data frame is constituted by L (Legacy)-STF (Short Training Field), L-LTF (Long Training Field), L-SIG, RL-SIG (Repeated L-SIG), HE (High Efficiency)-SIG-A, HE-SIG-B, HE-STF, and a HE-LTF group. For example, STF is used for rough synchronization acquisition and LTF is used for detailed synchronization acquisition, channel estimation, and the like. In addition, signaling information that is compliant with each standard is described in each SIG

FIELD

A feature of a parameter of HE-SIG-A included in the preamble is that a bit of Coordinate Transmit that identifies that a coordinate transmit operation is being performed is prepared. Based on the bit, a receiving-side communication apparatus of the data frame can identify that a same MPDU is included in another A-MPDU to be transmitted by spatially multiplexed transmission (in other words, a same MPDU is being transmitted by coordinate transmit from a plurality of transmission sources).

In addition, parameters of HE-SIG-B included in the preamble include a Coordinate Parameter in which a parameter for performing a coordinate transmit operation is described. Various communication parameters such as an MCS, transmission power, and a guard interval length that are used when performing coordinate transmit are described in Coordinate Parameter.

In addition, in the example shown in FIG. 12, eight MPDUs (subframes) from MPDU-1 to MPDU-8 are aggregated to constitute an A-MPDU and an EOF (End of Frame) padding (Pad) is added if necessary. However, the number of aggregates of subframes is not limited to eight and the number of aggregates of subframes may be seven or smaller or nine or larger.

A predetermined delimiter and, if necessary, an end padding are added to each MPDU that is configured as a subframe of the A-MPDU frame.

Each MPDU is constituted by a predetermined MAC header and a data payload, and a frame check sequence (FCS) having been calculated according to a predetermined calculation procedure is added to an end for each MPDU.

The MAC header is constituted by respective fields of Frame Control that indicates a format of the frame, Duration that indicates a duration of the frame, Address1 to Address4 for appropriately designating a transmitting/receiving apparatus, Sequence Control that stores a sequence number of the like, QoS Control in which a QoS (Quality of Service) parameter is described, and HT (High Throughput) Control in which a high-speed transmission parameter is described.

FIGS. 13 to 19 respectively show a configuration example of a data frame to be applied to data sharing and coordinate transmit. In each drawing, an abscissa is adopted as a time axis.

FIG. 13 shows a configuration example of a frame that is used when sharing data using a plurality of spatially multiplexed streams between access points. According to the illustrated frame configuration, when sharing pieces of data from MPDU-1 to MPDU-4, the pieces of data can be shared in a short period of time by configuring the respective MPDUs as different spatially multiplexed streams SD1 to SD4 and performing multiplexed transmission.

For example, in the wireless network configuration shown in FIG. 1, by transmitting a data frame shown in FIG. 13 from AP1 that actively performs coordinate transmit to AP2 that passively performs coordinate transmit, sharing of coordinate transmit data from MPDU-1 to MPDU-4 between AP1 and AP2 can be realized in a short period of time. In addition, a required time for data sharing can be further reduced by utilizing MCS that enables high-speed transmission.

FIG. 14 shows a configuration of data to be transmitted from the access point AP1 in the wireless network shown in FIG. 1. In this case, an example is shown in which AP1 configures pieces of data (MPDU-1 to MPDU-4) for performing coordinate transmit which are addressed to the communication terminal STA3 that is subordinate to AP1 as a first spatially multiplexed stream SD1 and configures pieces of data (MPDU-1 to MPDU-6) which are addressed to another communication terminal STA1 that is subordinate to AP1 as a second spatially multiplexed stream SD2. When data lengths do not match between spatially multiplexed streams, the data lengths are made the same by applying padding (Pad) to whichever spatially multiplexed stream is shorter. In the example shown in FIG. 14, padding (Pad) is applied to SD2. However, the data configuration shown in FIG. 14 is premised on the number of spatially multiplexed streams that can be received by STA1 to be a reception destination being 1 and the number of spatially multiplexed streams that can be received by STA3 to be a reception destination being 2 or more.

FIG. 15 shows a configuration of data to be transmitted from the access point AP2 in the wireless network shown in FIG. 1. In this case, an example is shown in which AP2 configures pieces of data (MPDU-1 to MPDU-4) for performing coordinate transmit which are addressed to the communication terminal STA3 that belongs to another wireless network as a first spatially multiplexed stream SD3 and configures pieces of data (MPDU-1 to MPDU-8) which are addressed to another communication terminal STA2 that is subordinate to AP2 as a second spatially multiplexed stream SD4. When data lengths do not match between spatially multiplexed streams, the data lengths are made the same by applying padding (Pad) to whichever spatially multiplexed stream is shorter. In the example shown in FIG. 15, padding (Pad) is applied to SD4. However, the data configuration shown in FIG. 15 is premised on the number of spatially multiplexed streams that can be received by STA2 to be a reception destination being 1 and the number of spatially multiplexed streams that can be received by STA3 to be a reception destination being 2 or more.

FIG. 16 shows a configuration example of a data frame for transmitting shared data from the master access point (M-AP) to a plurality of access points. In this case, an example is shown in which, in the wireless network shown in FIG. 2, four spatially multiplexed streams SD1 to SD4 are configured as a frame to be transmitted from M-AP to the respective access points AP1 and AP2.

First, AP1 and AP2 configure the pieces of data (MPDU-1 to MPDU-4) for performing coordinate transmit and addressed to STA3 as a first spatially multiplexed stream SD1. In addition, AP1 configures the pieces of data (MPDU-1 to MPDU-6) to be transmitted to another communication terminal STA1 as a second spatially multiplexed stream SD2. Furthermore, AP2 configures the pieces of data (MPDU-1 to MPDU-8) to be transmitted to another communication terminal STA2 as a third spatially multiplexed stream SD3. Moreover, the pieces of data (MPDU-1 to MPDU-7) that are addressed to AP2 are configured as a fourth spatially multiplexed stream SD4. When data lengths do not match between spatially multiplexed streams, the data lengths are made the same by applying padding (Pad) to whichever spatially multiplexed stream is shorter. In the example shown in FIG. 16, padding (Pad) is respectively applied to SD2, SD3, and SD4.

Transmitting the data frame shown in FIG. 16 enables sharing of coordinate transmit data from MPDU-1 to MPDU-4 to be shared between AP1 and AP2 in a short period of time and enables data to be respectively transmitted by AP1 and AP2 to other communication terminals to be sent together. In addition, a required time for data sharing can be further reduced by utilizing MCS that enables high-speed transmission.

FIG. 17 shows another configuration example of a data frame for transmitting shared data from the master access point (M-AP) to a plurality of access points. In this case, an example is shown in which, in the wireless network shown in FIG. 2, eight spatially multiplexed streams SD1 to SD8 are configured as a frame to be transmitted from M-AP to the respective access points AP1 and AP2.

First, AP1 and AP2 configure the pieces of data (MPDU-1 to MPDU-4) for performing coordinate transmit and addressed to STA3 as a first spatially multiplexed stream SD1. In addition, AP1 configures a part (MPDU-1 to MPDU-4) of the pieces of data to be transmitted to the communication terminal STA1 as a second spatially multiplexed stream SD2 and, further, AP1 configures the remaining pieces of data (MPDU-5 and MPDU-6) to be transmitted to STA1 as a third spatially multiplexed stream SD3.

In addition, AP2 configures a part (MPDU-1 to MPDU-4) of the pieces of data to be transmitted to another communication terminal STA2 as a fourth spatially multiplexed stream SD4 and, further, AP2 configures the remaining pieces of data (MPDU-5 to MPDU-8) to be transmitted to STA2 as a fifth spatially multiplexed stream SD5.

Furthermore, a part (MPDU-1 to MPDU-4) of the pieces of data addressed to AP2 is configured as a sixth spatially multiplexed stream SD6 and, further, the remaining pieces of data (MPDU-5 to MPDU-7) addressed to AP2 is configured as a seventh spatially multiplexed stream SD7.

Moreover, in order to improve reliability of the pieces of data (MPDU-1 to MPDU-4) for performing coordinate transmit and addressed to STA3, AP1 and AP2 also configure an eighth spatially multiplexed stream SD8 as a same piece of data as SD1.

Transmitting the data frame shown in FIG. 17 enables sharing of coordinate transmit data from MPDU-1 to MPDU-4 to be shared between AP1 and AP2 in a short period of time and enables data to be respectively transmitted by AP1 and AP2 to other communication terminals to be sent together. In addition, a required time for data sharing can be further reduced by utilizing MCS that enables high-speed transmission.

FIG. 18 shows a configuration example of a data frame to be transmitted from the access point AP1 in the wireless network shown in FIG. 2.

In the diagram, AP1 configures the pieces of data (MPDU-1 to MPDU-4) to be transmitted to the communication terminal STA3 that is subordinate to AP1 as a first spatially multiplexed stream SD1. In addition, AP1 configures the pieces of data (MPDU-1 to MPDU-6) that are addressed to another communication terminal STA1 that is subordinate to AP1 as a second spatially multiplexed stream SD2.

Furthermore, in order to improve reliability of the pieces of data (MPDU-1 to MPDU-4) for performing coordinate transmit and addressed to STA3, AP1 configures a third spatially multiplexed stream SD3 as a same piece of data as the first spatially multiplexed stream SD1.

Moreover, in order to improve reliability of the pieces of data (MPDU-1 to MPDU-6) to be transmitted by multiplexed transmission to STA1, AP1 configures a fourth spatially multiplexed stream SD4 as a same piece of data as the second spatially multiplexed stream SD2.

When data lengths do not match between spatially multiplexed streams, the data lengths are made the same by applying padding (Pad) to whichever spatially multiplexed stream is shorter. In the example shown in FIG. 18, padding (Pad) is respectively applied to SD2 and SD4. However, the data configuration shown in FIG. 18 is premised on the number of spatially multiplexed streams that can be received by STA1 to be a reception destination being 2 or more and the number of spatially multiplexed streams that can be received by STA3 to be a reception destination being 4 or more.

FIG. 19 shows a configuration example of a data frame to be transmitted from the access point AP2 in the wireless network shown in FIG. 2.

In the diagram, AP2 configures the pieces of data (MPDU-1 to MPDU-4) to be transmitted to the communication terminal STA3 belonging to another wireless network as a first spatially multiplexed stream SD1. In addition, AP2 configures the pieces of data (MPDU-1 to MPDU-8) that are addressed to the communication terminal STA2 that is subordinate to AP2 as a third spatially multiplexed stream SD3.

Furthermore, in order to improve reliability of the pieces of data (MPDU-1 to MPDU-4) for performing coordinate transmit and addressed to STA3, AP2 configures a second spatially multiplexed stream SD2 as a same piece of data as the first spatially multiplexed stream SD1.

Moreover, in order to improve reliability of the pieces of data (MPDU-1 to MPDU-8) to be transmitted by multiplexed transmission to STA2, AP2 configures a fourth spatially multiplexed stream SD4 as a same piece of data as the third spatially multiplexed stream SD3.

When data lengths do not match between spatially multiplexed streams, the data lengths are made the same by applying padding (Pad) to whichever spatially multiplexed stream is shorter. In the example shown in FIG. 19, padding (Pad) is respectively applied to SD3 and SD4. However, the data configuration shown in FIG. 19 is premised on the number of spatially multiplexed streams that can be received by STA2 to be a reception destination being 2 or more and the number of spatially multiplexed streams that can be received by STA3 to be a reception destination being 4 or more.

Figure 20:
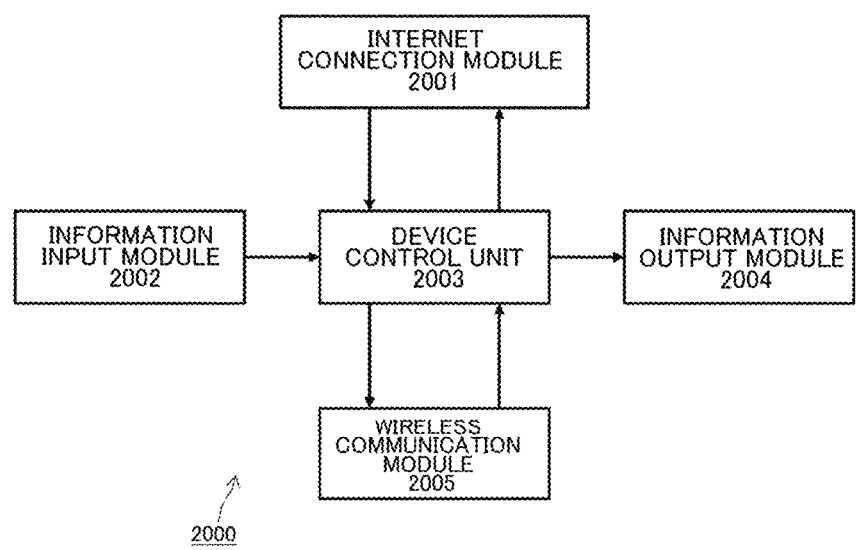
FIG. 20 is a diagram schematically showing a functional configuration example of a communication apparatus 2000.

FIG. 20 schematically shows a functional configuration example of a communication apparatus 2000 that is capable of functioning as a communication terminal and an access point. The illustrated communication apparatus 2000 includes an Internet connection module 2001, an information input module 2002, a device control unit 2003, an information output module 2004, and a wireless communication module 2005. However, the communication apparatus 2000 may be constituted only by modules considered necessary for the communication apparatus 2000 to operate as a communication terminal or an access point and configured so that unnecessary modules are either simplified or have not been built in or, conversely, the communication apparatus 2000 may be configured by further incorporating other functional modules (not illustrated).

For example, when the communication apparatus 2000 functions as an access point, the Internet connection module 2001 is mounted with a function such as a communication modem for connecting to the Internet and realizes Internet connection via a public communication line and an Internet service provider.

The information input module 2002 is a functional module for inputting information that conveys an instruction from a user and is constituted by, for example, a push button, a keyboard, or a touch panel.

The device control unit 2003 is a functional module that performs control for causing the communication apparatus 2000 to operate as a communication terminal or an access point exactly as intended by the user.

The information output module 2004 is a functional module for presenting the user with an operational state of the communication apparatus 2000 or information obtained via the Internet. For example, the information output module 2004 is constituted by a display element such as an LED (Light Emitting Diode), a liquid crystal panel, or an organic EL (Electro-Luminescence) display or a device such as a speaker that outputs voice or music. The information output module 2004 is configured to display or notify the user of information during processing or after processing by the device control unit 2003.

The wireless communication module 2005 is a functional module which is constituted by, for example, a processor such as a microprocessor or a circuit and which is used for processing wireless communication in the communication apparatus 2000. It is assumed that wireless communication unit as hereby referred to includes operating as an access point that actively or passively performs coordinate transmit or a master access point that manages coordinate transmit and performing sharing of data between access points and coordinate transmit of data to communication terminals. Details of a wireless communication operation will be provided later.

Figure 21:
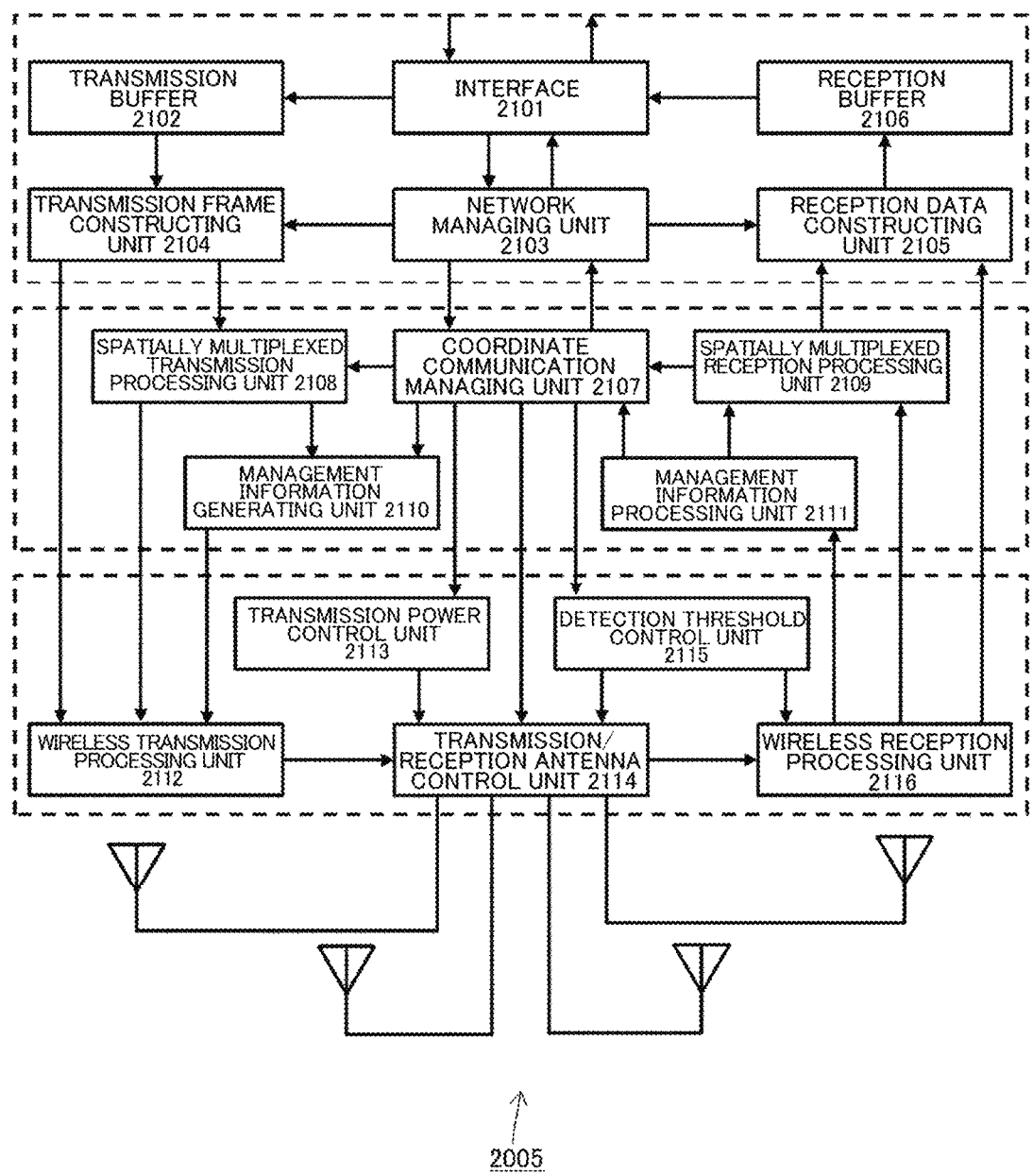
FIG. 21 is a diagram showing an internal configuration example of a wireless communication module 2005.

FIG. 21 shows an internal configuration example of the wireless communication module 2005 in the communication apparatus 2000 shown in FIG. 20. The illustrated wireless communication module 2005 includes an interface 2101, a transmission buffer 2102, a network managing unit 2103, a transmission frame constructing unit 2104, a reception data constructing unit 2105, a reception buffer 2106, a coordinate communication managing unit 2107, a spatially multiplexed transmission processing unit 2108, a spatially multiplexed reception processing unit 2109, a management information generating unit 2110, a management information processing unit 2111, a wireless transmission processing unit 2112, a transmission power control unit 2113, a transmission/reception antenna control unit 2114, a detection threshold control unit 2115, and a wireless reception processing unit 2116.

In this case, the interface 2101, the transmission buffer 2102, the network managing unit 2103, the transmission frame constructing unit 2104, the reception data constructing unit 2105, and the reception buffer 2106 are configured as portions shared by software in a wireless LAN system based on a standard such as IEEE 802.11. In addition, the wireless transmission processing unit 2112, the transmission power control unit 2113, the transmission/reception antenna control unit 2114, the detection threshold control unit 2115, and the wireless reception processing unit 2116 are configured as portions shared by baseband processing in the wireless LAN system.

The interface 2101 is a functional module for converting input from the user, data from the Internet, and information to the user into a predetermined signal format.

The transmission buffer 2102 is a functional module for temporary storage when an input from the user or a signal to be wirelessly transmitted is received from the interface 2101.

The network managing unit 2103 is a functional module that manages address information and the like of communication apparatuses included in the wireless network. When the communication apparatus 2000 is operating as an access point, the network managing unit 2103 manages address information of communication apparatuses (such as communication terminals) that connects to its own communication apparatus 2000. In addition, when the communication apparatus 2000 is operating as a communication terminal, the network managing unit 2103 manages address information of access points to become connection destinations.

In the present embodiment, an access point is configured to comprehend the presence of other access points that are present in the periphery and, if necessary, operate in coordination with the other access points. Therefore, when the communication apparatus 2000 is operating as an access point, the network managing unit 2103 is configured to also manage information on the other access points that are present in the periphery when necessary.

The transmission frame constructing unit 2104 is a functional module for constructing wireless transmission data as a data frame to be wirelessly transmitted. In addition, the transmission frame constructing unit 2104 is constructed to gather a plurality of MPDUs that are stored in the transmission buffer 2102 to construct an A-MPDU.

The reception data constructing unit 2105 is a functional module for reconstructing original data from a wirelessly received data frame. For example, when an A-MPDU is received, the reception data constructing unit 2105 removes predetermined header information from a data frame of the A-MPDU, extracts an MPDU, and extracts only a necessary data portion.

The reception buffer 2106 is a functional module that temporarily stores, based on a sequence number, the data portion extracted by the reception data constructing unit 2105 until all data frames are obtained. The reception buffer 2106 is configured to store the reception data until a timing where data is to be output to an application device (not illustrated) that is connected via the interface 2101 arrives.

When the communication apparatus 2000 operates as an access point, the coordinate communication managing unit 2107 comprehends the presence of other access points that are present in the periphery, makes a determination of whether or not a coordinate transmit operation is to be performed with the other access points, and sets parameters and the like.

Specifically, when the communication apparatus 2000 operates as an access point that actively performs coordinate transmit (or a master access point that manages coordinate transmit), the coordinate communication managing unit 2107 performs control for transmitting an initiate frame (refer to FIG. 9) upon initiation of data sharing for coordinate transmit and transmitting a trigger frame (refer to FIG. 11) to another access point that passively performs coordinate transmit.

In addition, when the communication apparatus 2000 operates as an access point that passively performs coordinate transmit, the coordinate communication managing unit 2107 performs control for receiving an initiate frame from another access point and transmitting a grant frame (refer to FIG. 10) upon reception confirmation of shared data.

On the other hand, when the communication apparatus 2000 is connected to a wireless network of any of the access points as a communication terminal, the coordinate communication managing unit 2107 performs various settings in the wireless communication module 2005 for receiving data transmitted by coordinate transmit from a plurality of access points in the periphery.

The spatially multiplexed transmission processing unit 2108 is a functional module that performs setting of the number of spatial multiplexes that is necessary when performing simultaneous transmission of a plurality of spatially multiplexed streams and setting of various parameters that are necessary when transmitting a spatially multiplexed stream.

For example, when the communication apparatus 2000 performs coordinate transmit as an access point, the spatially multiplexed transmission processing unit 2108 sets a spatially multiplexed stream to be transmitted by coordinate transmit, and when the spatially multiplexed stream is to be transmitted by being multiplexed with data addressed to a communication terminal, the spatially multiplexed transmission processing unit 2108 sets necessary parameters in each case. Specifically, the spatially multiplexed transmission processing unit 2108 matches timings of coordinate transmit with adjacent access points and performs control for transmitting spatially multiplexed streams by matching necessary parameters.

The spatially multiplexed reception processing unit 2109 is a functional module that performs setting of the number of spatial multiplexes that is necessary when performing simultaneous reception of a plurality of spatially multiplexed streams and setting of various parameters that are necessary when receiving a spatially multiplexed stream. Specifically, the spatially multiplexed reception processing unit 2109 performs control for extracting a spatially multiplexed stream which is sent from one or more access points in the periphery and of which reception by the communication apparatus 2000 itself is considered necessary.

In a wireless network environment in which data sharing and coordinate transmit are performed by a plurality of access points, the spatially multiplexed reception processing unit 2109 is configured to comprehend that a same piece of data is being transmitted from different access points and, if necessary, perform control for compositing the reception data and constructing the reception data.

The management information generating unit 2110 is a functional module for constructing a beacon signal that is necessary for managing a network and a control frame and a management frame that are required by a communication control protocol. In the present embodiment, when the communication apparatus 2000 operates as an access point, the management information generating unit 2110 generates an initiate frame, a grant frame, a block ACK request frame, and the like. On the other hand, when the communication apparatus 2000 operates as a communication terminal, the management information generating unit 2110 generates an ACK frame.

The management information processing unit 2111 is a functional module for constructing, when a received frame is a control frame or a management frame, control information required by the communication control protocol. When the received frame is a beacon frame, the management information processing unit 2111 is configured to deliver parameters described in the beacon frame to the coordinate communication managing unit 2107 and the network managing unit 2103 and comprehend parameters of access points. In addition, when the received frame is an initiate frame or a grant frame, the management information processing unit 2111 notifies the coordinate communication managing unit 2107 of parameters, and when the communication apparatus 2000 operates as an access point or operates as a communication terminal, the management information processing unit 2111 performs subsequent processing as respectively deemed necessary.

The wireless transmission processing unit 2112 is a functional module which adds a predetermined preamble to a frame such as a data frame to be wirelessly transmitted in a predetermined frequency channel, converts the frame into a predetermined baseband signal, and processes the frame as an analog signal. While the wireless transmission processing unit 2112 is depicted as a single functional module in FIG. 21, when handling a plurality of spatially multiplexed streams, a configuration may be adopted in which a plurality of elements operate in parallel in order to simultaneously transmit the respective streams. In addition, a configuration may be adopted in which signals of different spatially multiplexed streams are supplied to a transmission antenna from a plurality of wireless transmission processing units.

The transmission power control unit 2113 is a functional module which, when transmitting a predetermined frame, controls transmission power so that a signal does not reach an unnecessary radio wave reachable range. In the present embodiment, it is assumed that the transmission power control unit 2113 is configured to control data transmission by adjusting transmission power to a minimally required level so that a signal reaches a receiving side at an intended reception electric field intensity.

A plurality of antenna elements are connected to the transmission/reception antenna control unit 2114, and the transmission/reception antenna control unit 2114 executes control for wirelessly transmitting signals as spatially multiplexed streams and processing for receiving signals having been transmitted as the spatially multiplexed streams.

The detection threshold control unit 2115 is a functional module which, when transmission power control is performed, sets a signal detection level such that a signal from a communication apparatus that is present within a radio wave reachable range can be detected and performs control so that a signal can be detected with a minimally required detection threshold. The detection threshold control unit 2115 is configured to detect a signal at or above a predetermined detection level in a channel that is currently in use.

The wireless reception processing unit 2116 is a functional module which, when detecting a predetermined preamble signal, separates individual streams that have been spatially multiplexed and performs reception processing of header and data portions that are added after the preamble. While the wireless reception processing unit 2116 is depicted as a single functional module in FIG. 21, when handling a plurality of spatially multiplexed streams, a configuration may be adopted in which a plurality of elements operate in parallel in order to simultaneously receive the respective streams.

When the communication apparatus 2000 is configured as an access point, the communication apparatus 2000 is compliant with spatially multiplexed transmission as is apparent from the configuration inside the wireless communication module 2005 shown in FIG. 21. On the other hand, when the communication apparatus 2000 is configured as a communication terminal, while it is more preferable that the communication apparatus 2000 is compliant with spatially multiplexed transmission, the communication apparatus 2000 is not required to be compliant with spatially multiplexed transmission.

Figure 22:
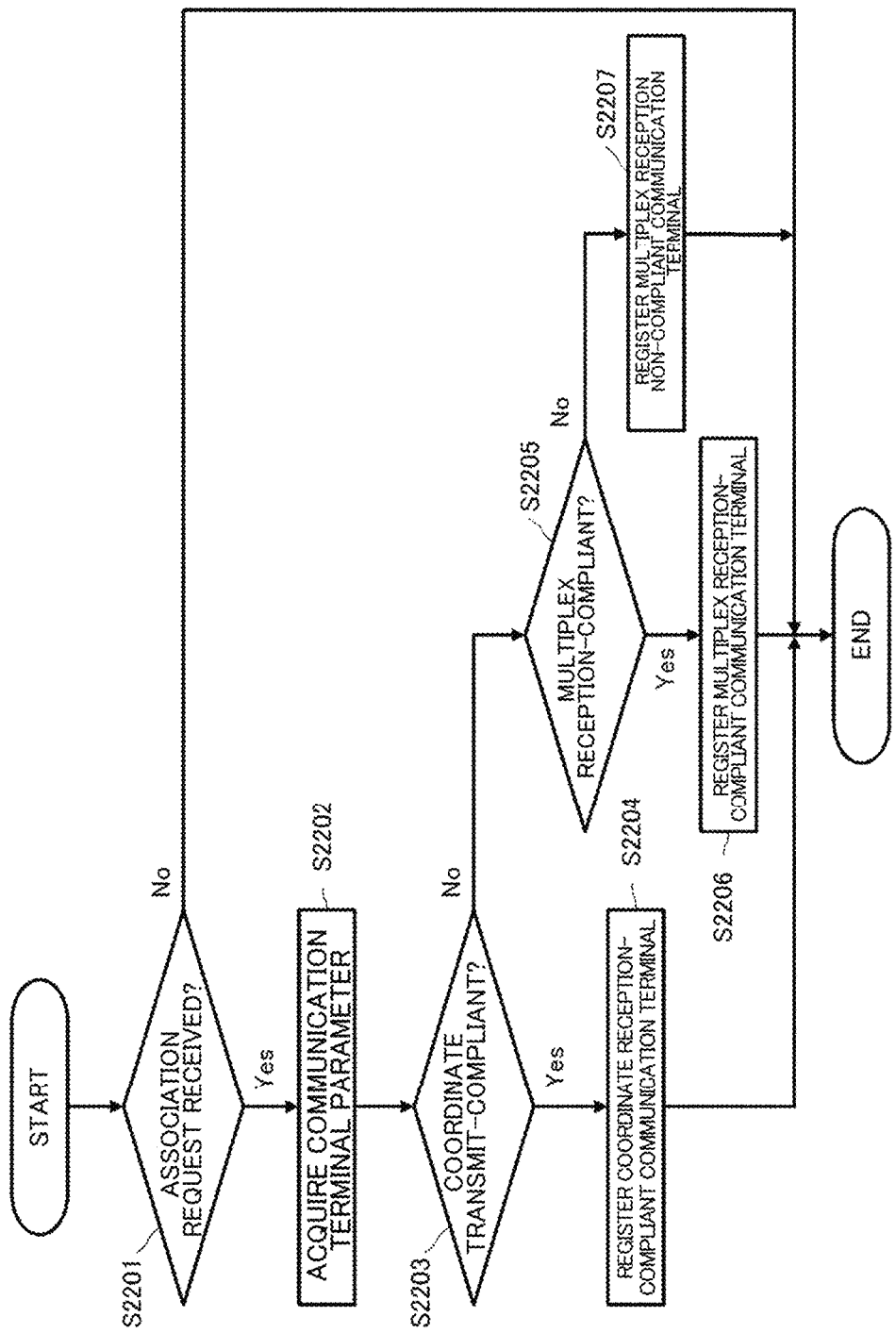
FIG. 22 is a flow chart showing processing procedures that are performed by an access point to register a communication terminal.

FIG. 22 shows, in a flow chart format, processing procedures that are performed by an access point to register a communication terminal. It is assumed that the illustrated processing procedures are performed in the communication apparatus 2000 that operates as an access point.

When the access point receives an association request frame (refer to FIG. 7) from an existing communication terminal (already connected to the access point itself) or a new communication terminal (not connected to the access point itself) (Yes in step S2201), the access point acquires a parameter of the communication terminal (step S2202) and checks whether or not the communication terminal is capable of receiving data to be transmitted by coordinate transmit from a plurality of access points based on described contents of a coordinate transmit information element or the like (step S2203).

When the communication terminal making the association request is compliant with reception (coordinate reception) of data to be transmitted by coordinate transmit (Yes in step S2203), the access point registers the communication terminal as a coordinate reception-compliant terminal (step S2204) and ends the present processing.

On the other hand, when the communication terminal making the association request is not compliant with reception (coordinate reception) of data to be transmitted by coordinate transmit (No in step S2203), the access point further checks whether or not the communication terminal is compliant with reception (multiplex reception) of spatially multiplexed streams (step S2205).

In addition, when the communication terminal making the association request is compliant with reception of spatially multiplexed streams (Yes in step S2205), the access point registers the communication terminal as a multiplex reception-compliant terminal (step S2206) and ends the present processing. In addition, when the communication terminal making the association request is not compliant with reception of spatially multiplexed streams (No in step S2205), the access point registers the communication terminal as a multiplex reception non-compliant terminal (step S2207) and ends the present processing.

Figure 23:
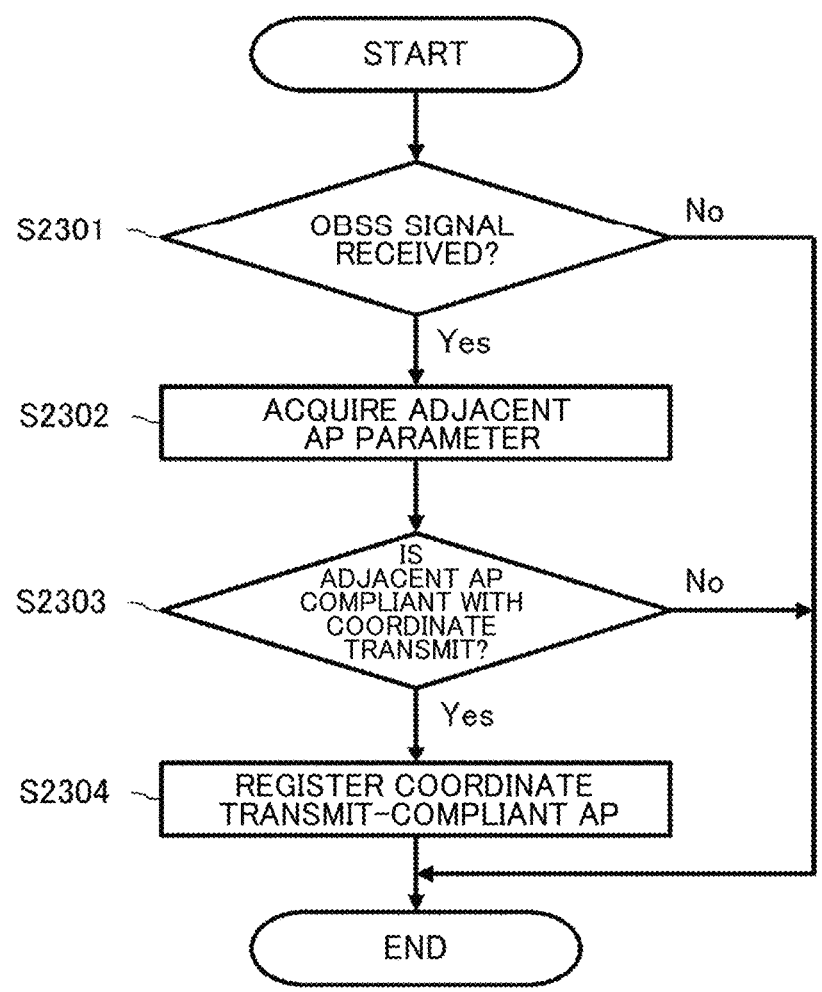
FIG. 23 is a flow chart showing processing procedures that are performed by an access point to register an adjacent access point.

FIG. 23 shows, in a flow chart format, processing procedures that are performed by an access point to register an adjacent access point. It is assumed that the illustrated processing procedures are performed in the communication apparatus 2000 that operates as an access point (an access point that actively performs coordinate transmit or a master access point that manages coordinate transmit).

When the access point receives a signal (an OBSS signal) from a BSS (Basic Service Set) that is present in an overlapping manner (Yes in step S2301), the access point acquires an operation parameter of an adjacent access point from the received signal (step S2302). As the OBSS signal, for example, an association response frame (refer to FIG. 7) transmitted by a communication terminal is assumed, and the operation parameter of an adjacent access point can be acquired based on described contents of a coordinate transmit information element or the like.

Next, the access point checks whether or not the adjacent access point is compliant with coordinate transmit based on described contents of a coordinate transmit information element or the like (step S2303).

In addition, when the adjacent access point is compliant with coordinate transmit (Yes in step S2303), the access point registers the adjacent access point as a coordinate transmit-compliant access point (step S2304) and ends the present processing. In addition, when the adjacent access point is not compliant with coordinate transmit (No in step S2303), the access point ends the present processing without registering the adjacent access point.

While the registration processing of the coordinate transmit-compliant access point described above may be performed in all access points, the registration processing may be executed only by an access point that actively performs coordinate transmit or a master access point that manages coordinate transmit and the registration processing may not be performed by an access point that passively performs coordinate transmit.

Figure 24:
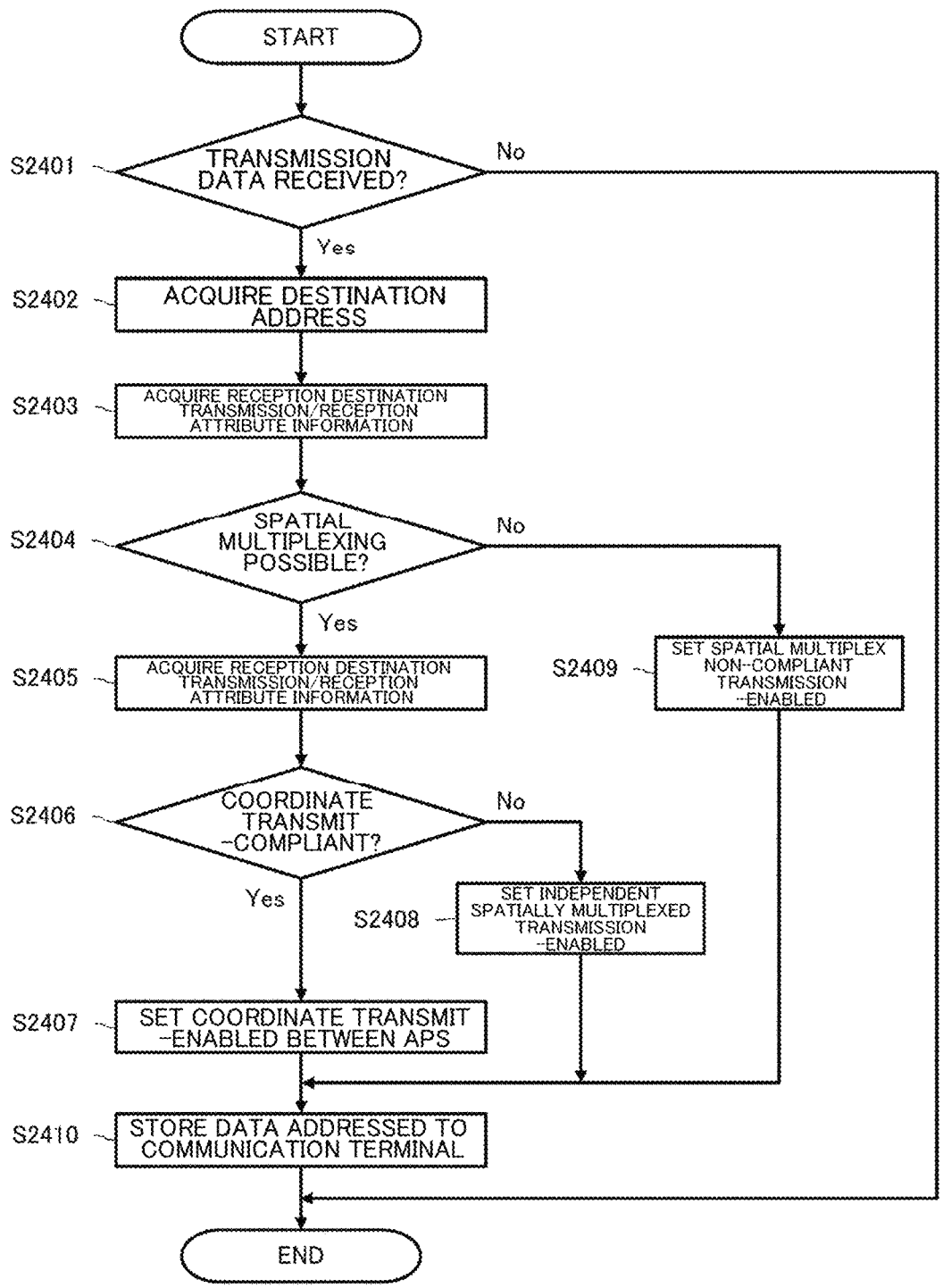
FIG. 24 is a flow chart showing processing procedures that are performed by an access point upon receiving transmission data.

FIG. 24 shows, in a flow chart format, processing procedures that are performed by an access point upon receiving transmission data. It is assumed that the illustrated processing procedures are performed in the communication apparatus 2000 that operates as an access point.

When the access point receives transmission data via the interface 2001 (Yes in step S2401), the access point acquires address information of a communication apparatus to be a reception destination of the transmission data (step S2402) and further acquires association information of the communication apparatus (a communication terminal) to be the reception destination (step S2403).

Next, the access point checks whether or not spatially multiplexed transmission of transmission data is possible (step S2404). Whether or not spatially multiplexed transmission can be performed is determined based on, in addition to the access point itself being compliant with spatially multiplexed transmission, whether or not the communication apparatus that is the reception destination is compliant with spatially multiplexed transmission. When both sides are capable of spatially multiplexed transmission, an allowable (maximum) number of spatially multiplexed streams is to be determined based on the respective number of possible multiplexed streams of the access point itself and the communication apparatus that is the reception destination.

In addition, when spatially multiplexed transmission is possible (Yes in step S2404), the access point acquires a state of connection with an access point of a BSS (OBSS) that is present in an overlapping manner (step S2405) and further checks whether or not coordinate transmit with the OBSS AP is possible (step S2406).

In step S2406, a case where coordinate transmit can be performed is, specifically, a case where the access point itself has the capability to perform coordinate transmit and there is an OBSS AP having already been registered as a coordinate transmit-compliant access point in accordance with processing procedures shown in FIG. 23 or the like.

In this case, when coordinate transmit with the OBSS AP is possible (Yes in step S2406), the access point sets the transmission data received in step S2401 as transmission data of which spatially multiplexed transmission can be performed in coordination between access points (step S2407). On the other hand, when coordinate transmit with the OBSS AP is not possible (No in step S2406), the access point sets the transmission data as transmission data of which spatially multiplexed transmission can be performed independently (step S2408).

In addition, when spatially multiplexed transmission is not possible (No in step S2404), the access point sets the transmission data received in step S2401 as transmission data that can be transmitted as spatial multiplex non-compliant (step S2409).

Subsequently, the access point stores data addressed to the communication apparatus of which address information has been acquired in step S2402 together with a transmission possibility (any of coordinate transmit-enabled, independent spatially multiplexed transmission-enabled, and independent non-spatially multiplexed transmission-enabled) in the transmission buffer (step S2410) and ends the present processing.

Figure 25:
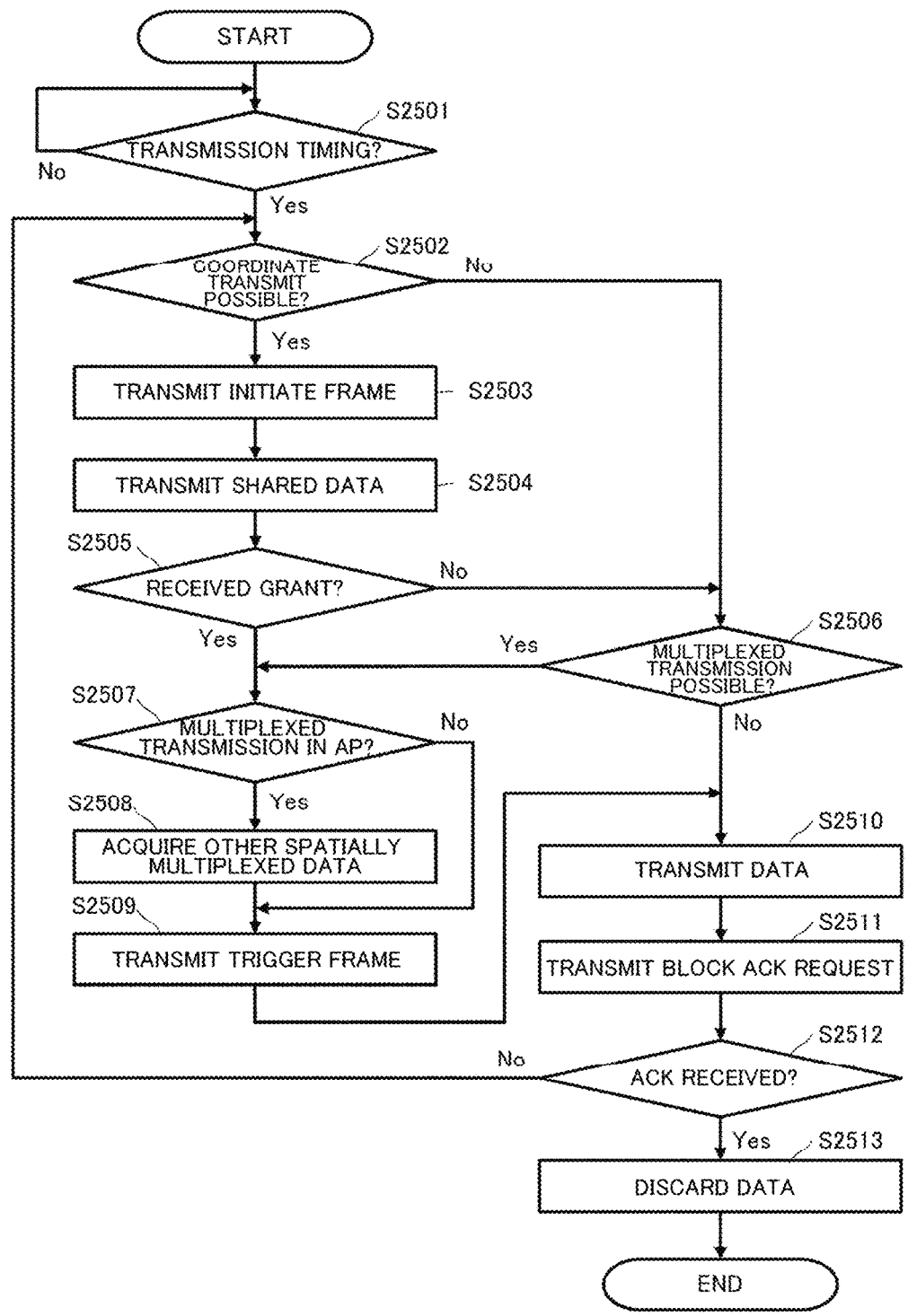
FIG. 25 is a flow chart showing processing procedures that are performed by an access point to actively perform coordinate transmit.

FIG. 25 shows, in a flow chart format, processing procedures that are performed by an access point to actively perform coordinate transmit. It is assumed that the illustrated processing procedures are performed in the communication apparatus 2000 that operates as an access point.

When there is data to be transmitted and a transmission timing arrives (Yes in step S2501), the access point checks whether or not coordinate transmit can be performed (step S2502).

A case where there is data to be transmitted in step S2501 is, for example, a case where transmission data is received according to the processing procedures shown in FIG. 24 and the transmission data is stored in the transmission buffer 2102. In addition, a case where coordinate transmit can be performed in step S2502 is, specifically, a case where the access point itself has the capability to perform coordinate transmit and there is a coordinate transmit-compliant access point having already been registered in accordance with the processing procedures shown in FIG. 23 or the like.

When coordinate transmit can be performed (Yes in step S2502), the access point transmits an initiate frame (refer to FIG. 9) to an adjacent access point that is compliant with coordinate transmit (step S2503), and after subsequently transmitting shared data for the coordinate transmit (step S2504), stands by for a grant frame (refer to FIG. 10) from an access point that is a transmission destination of the initiate frame (step S2505). The adjacent access point that is compliant with coordinate transmit in step S2503 is, for example, an access point having been registered as a coordinate transmit-compliant access point in accordance with the processing procedures shown in FIG. 23. In addition, in step S2504, utilizing MCS that enables high-speed transmission enables data sharing between access points to be realized in a short period of time.

In addition, when coordinate transmit cannot be performed (No in step S2502) or when a grant frame cannot be received from an adjacent coordinate transmit-compliant access point (No in step S2505), the access point checks whether or not multiplexed transmission of data can be performed (step S2506).

Whether or not multiplexed transmission can be performed in step S2506 is determined based on, in addition to the access point itself being compliant with multiplexed transmission, whether or not the communication apparatus that is the reception destination is compliant with multiplexed transmission. When both sides are capable of multiplexed transmission, an allowable (maximum) number of multiplexed streams is to be determined based on the respective number of possible multiplexed streams of the access point itself and the communication apparatus that is the reception destination.

In addition, when a grant frame is received from the access point that is the transmission destination of the initiate frame and reception of shared data can be confirmed (Yes in step S2505) or when a grant frame could not be received but multiplexed transmission of data can be performed (Yes in step S2506), the access point further checks whether or not spatially multiplexed transmission in the access point can be performed (step S2507). In step S2507, specifically, the access point checks whether or not a communication terminal that is compliant with spatially multiplexed transmission is present in the access point's own network and there is data addressed to the communication terminal.

When spatially multiplexed transmission in the access point can be performed (Yes in step S2507), the access point acquires other spatially multiplexed data (step S2508). In other words, the access point acquires data addressed to a communication terminal that is subordinate to the access point which is to be simultaneously transmitted by spatial multiplexing with coordinate transmit of shared data.

Next, the access point transmits a trigger frame for performing downlink multi-user spatially multiplexed transmission (DL MU-MIMO) to an adjacent coordinate transmit-compliant access point (step S2509).

Subsequently, after transmitting the trigger frame, the access point transmits data at a predetermined transmission timing (step S2510). A frame interval between the trigger frame and the spatially multiplexed transmission frame is constant. Therefore, by transmitting a trigger frame in advance, synchronization of time can be secured in units of microseconds between the access points that perform coordinate transmit. In addition, in step S2510, by multiplexing data addressed to other communication terminals (acquired in step S2508) using a spatial multiplexing technique with the data to be transmitted by coordinate transmit, the access point can utilize a wireless transmission path in an efficient manner.

In addition, when multiplexed transmission of data cannot be performed (No in step S2506), the access point transmits data at a predetermined transmission timing without transmitting a trigger frame (step S2510).

After the data transmission, the access point transmits a block ACK request frame as necessary (step S2511) and stands by to receive an ACK frame from the data receiving-side (step S2512).

In addition, when an ACK frame is received and all relevant data is normally received (Yes in step S2512), the access point discards the transmission data from the transmission buffer 2101 (step S2513) and ends the present processing.

When access points transmit shared data by coordinate transmit, a communication terminal that is a transmission destination of the shared data returns an ACK when data is received from any of the access points having performed the coordinate transmit. In any case, when an ACK is received from a communication terminal that is a coordinate transmit destination of the shared data (Yes in step S2512), the access point discards the shared data from the transmission buffer 2101 (step S2513) and ends the present processing.

On the other hand, when an ACK frame is not received and all of the relevant data is not received (No in step S2512), the access point returns to step S2502 to perform re-transmission processing of the data.

Figure 26:
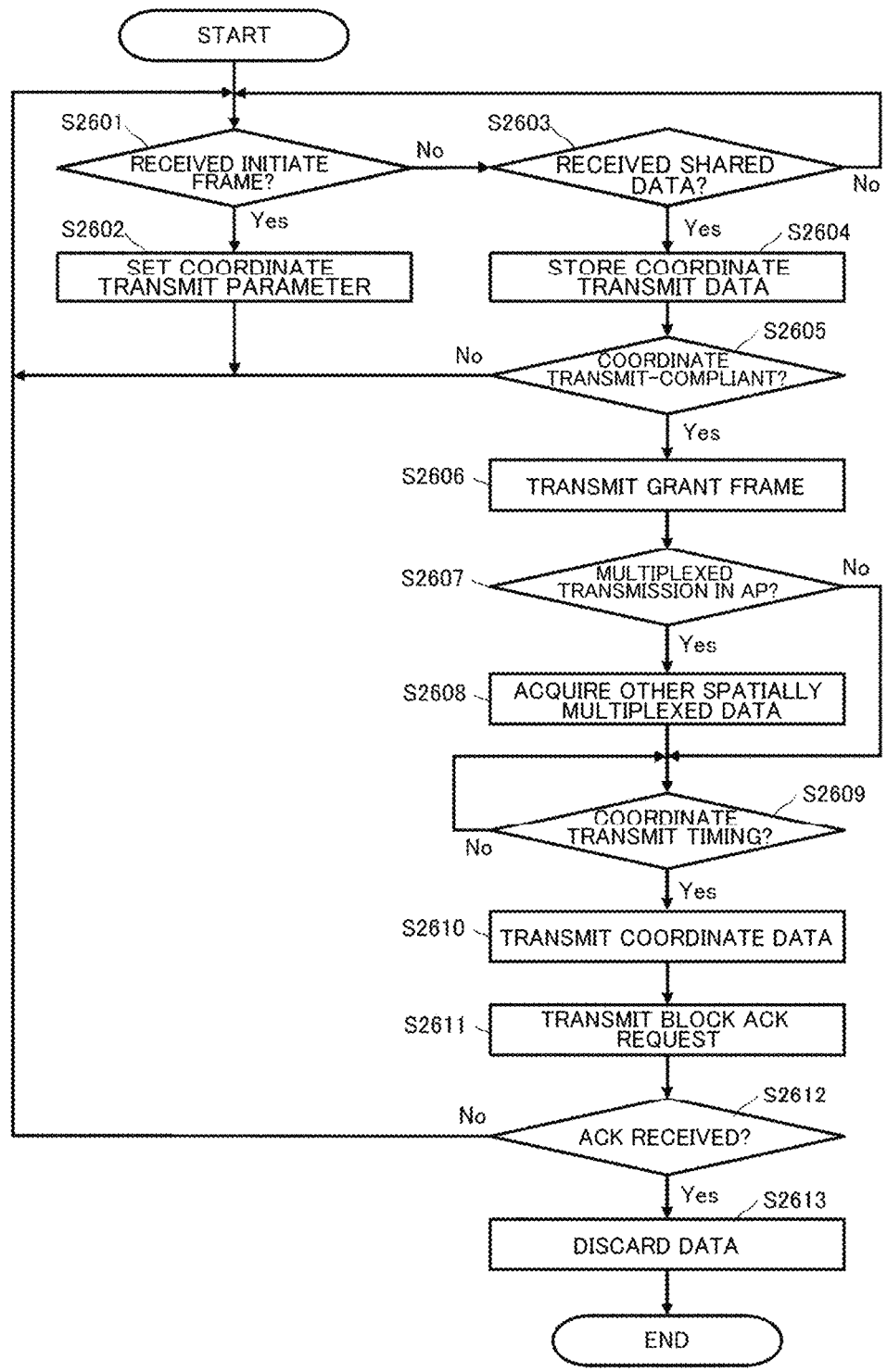
FIG. 26 is a flow chart showing processing procedures processing procedures that are performed by an access point to passively perform coordinate transmit.

FIG. 26 shows, in a flow chart format, processing procedures processing procedures that are performed by an access point to passively perform coordinate transmit. It is assumed that the illustrated processing procedures are performed in the communication apparatus 2000 that operates as an access point.

When the access point to passively perform coordinate transmit receives an initiate frame (refer to FIG. 9) from an adjacent access point (that actively performs coordinate transmit) (Yes in step S2601), the access point acquires parameters related to coordinate transmit that are described in the frame and performs setting for coordinate transmit (step S2602).

In addition, when the access point receives shared data for coordinate transmit to be subsequently sent (Yes in step S2603), the access point stores the shared data as coordinate transmit data in the transmission buffer 2101 (step S2604). Having the access point that actively performs coordinate transmit transmit the shared data by utilizing MCS that enables high-speed transmission enables data sharing between access points to be realized in a short period of time.

Next, the access point confirms that the access point itself is compliant with coordinate transmit or when the access point consents to performing coordinate transmit (Yes in step S2605), the access point transmits a grant frame (refer to FIG. 10) to an access point that is a transmission destination of the initiate frame (step S2606).

Next, the access point checks whether or not spatially multiplexed transmission can be performed in the access point (step S2607). In step S2607, specifically, the access point checks whether or not a communication terminal that is compliant with spatially multiplexed transmission is present in the access point's own network and there is data addressed to the communication terminal. In addition, an allowable (maximum) number of multiplexed streams is to be determined based on the respective number of possible multiplexed streams of the access point itself and the communication apparatus that is the reception destination.

In addition, when spatially multiplexed transmission in the access point can be performed (Yes in step S6507), the access point acquires other spatially multiplexed data (step S2608). In other words, the access point acquires data addressed to a communication terminal that is subordinate to the access point which is to be simultaneously transmitted by spatial multiplexing with coordinate transmit of shared data.

Subsequently, when a timing of coordinate transmit arrives by receiving a trigger frame for performing a downlink multi-user spatially multiplexed transmission (step S2609), the access point performs data transmission by coordinate transmit (step S2610). A frame interval between the trigger frame and the spatially multiplexed transmission frame is constant. Therefore, by receiving a trigger frame in advance, synchronization of time can be secured in units of microseconds between the access points that perform coordinate transmit. In addition, in step S2610, by multiplexing data addressed to other communication terminals (acquired in step S2608) using a spatial multiplexing technique with the data to be transmitted by coordinate transmit, the access point can utilize a wireless transmission path in an efficient manner.

After the data transmission, the access point transmits a block ACK request frame as necessary (step S2611) and stands by to receive an ACK frame from the data receiving-side (step S2612).

In addition, when an ACK frame is received and all relevant data is normally received (Yes in step S2612), the access point discards the transmission data from the transmission buffer 2101 (step S2613) and ends the present processing.

When access points transmit shared data by coordinate transmit, a communication terminal that is a transmission destination of the shared data returns an ACK when data is received from any of the access points having performed the coordinate transmit. In any case, when an ACK is received from a communication terminal that is a coordinate transmit destination of the shared data (Yes in step S2612), the access point discards the shared data from the transmission buffer 2101 (step S2613) and ends the present processing.

On the other hand, when an ACK frame is not received and all of the relevant data is not received (No in step S2612), the access point returns to step S2601 to perform re-transmission processing of the data.

Figure 27:
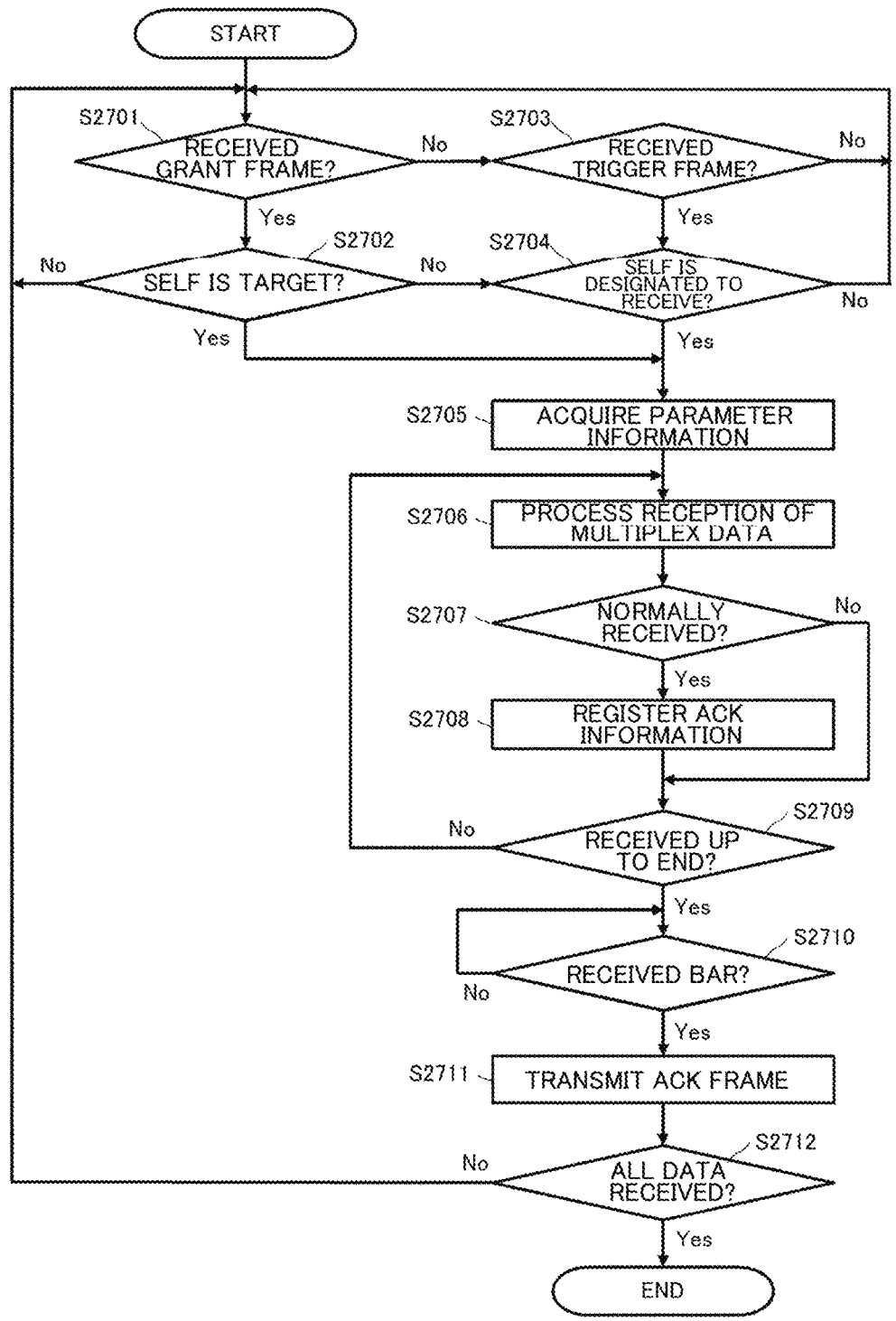
FIG. 27 is a flow chart showing processing procedures that are performed by a communication terminal to receive coordinate transmit data from a plurality of access points.

FIG. 27 shows, in a flow chart format, processing procedures that are performed by a communication terminal to receive coordinate transmit data from a plurality of access points. It is assumed that the illustrated processing procedures are performed in the communication apparatus 2000 that operates as a communication terminal under any of the access points.

When the communication terminal receives a grant frame (refer to FIG. 10) from an access point in a periphery (Yes in step S2701) and the communication terminal itself is designated as a reception target of coordinate transmit data in the grant frame (Yes in step S2702) or when the communication terminal receives a trigger frame (refer to FIG. 11) from an access point in a periphery and the communication terminal itself is designated as a reception destination in the trigger frame (Yes in step S2704), the communication terminal acquires parameter information having been described in the received grant frame or trigger frame (step S2705).

In addition, the communication terminal performs reception processing of multiplexed data to be sent at a predetermined timing (step S2706). The multiplexed data includes coordinate transmit data of which a designated target is the communication terminal itself (or another communication terminal) and data of which a designated reception destination is another communication terminal (or the communication terminal itself).

It is to be understood that designating a communication terminal to receive coordinate transmit data by describing information related to a communication terminal to be a reception target of coordinate transmit in the grant frame enables the target terminal to comprehend in advance that coordinate transmit is to be executed.

In addition, frame intervals between a grand frame, a trigger frame, and a data frame that is subsequently transmitted by coordinate transmit are constant. Therefore, by receiving a grand frame or a trigger frame in advance, the communication terminal can secure synchronization of time between the access points that perform coordinate transmit. In particular, when the communication terminal is able to receive an immediately previous trigger frame, synchronization of time can be secured in units of microseconds.

When the communication terminal is able to normally receive data in step S2706 (step S2707), the communication terminal records a sequence number of an MPDU thereof as ACK information (step S2708).

Until an end of a frame (an aggregation frame) is received (No in step S2709), the communication terminal returns to step S2706 and repetitively performs reception of aggregated MPDUs.

After the communication terminal receives the end of a frame (Yes in step S2709), when the communication terminal receives a predetermined block ACK request (BAR) which the communication terminal itself is designated to respond to (step S2710), the communication terminal sends back an ACK frame storing the ACK information having been recorded in step S2708 (step S2711).

After sending back the ACK frame, when collection of all data has been completed (Yes in step S2712), the communication terminal ends the present processing. On the other hand, when all data has not been received (No in step S2712), the communication terminal returns to step S2701 to await data to be re-sent.

Finally, effects and advantages of the technique for optimizing data sharing and coordinate transmit between a plurality of access points which has been proposed in the present specification will be summarized.

(1) Since a plurality of access points simultaneously transmit transmission data to be shared by coordinate transmit, reception of data can be performed in a stable manner at a coordinate transmit to be a destination of the transmission data.

(2) When sharing data for coordinate transmit between adjacent access points, configuring a plurality of pieces of data (MPDUs) as a spatially multiplexed stream enables sharing of data to be realized in a short period of time.

(3) Communication for data sharing between access points can be performed using a timing at which data transmission to a communication terminal to be a reception target of coordinate transmit cannot be performed.

(4) Designating a communication terminal to receive coordinate transmit data by describing information related to a communication terminal to be a reception target of coordinate transmit in the grant frame that notifies reception confirmation of shared data enables the reception terminal to comprehend in advance that coordinate transmit is to be executed.

(5) When performing coordinate transmit by a plurality of access points, multiplexing data addressed to a communication terminal other than a communication terminal to be a target of the coordinate transmit with data addressed to the communication terminal to be a target of the coordinate transmit enables wireless transmission to be performed in an efficient manner.

(6) As a transmission parameter when performing coordinate transmit with a plurality of access points, a coding scheme or a modulation scheme capable of reliably receiving a transmission from an access point in an inferior connection state is selected. Therefore, while a wireless transmission path may possibly be occupied for a relatively long period of time by performing coordinate transmit, using this time to multiplex and transmit a larger amount of data to another communication apparatus in a superior connection state enables transmission path utilization efficiency to be improved.

(7) By simultaneously performing, using a spatial division multiplexing technique, communication to a communication terminal that is connected to an access point itself and communication to a communication terminal that is connected to another access point, the access point can be utilize a wireless transmission path in an efficient manner.

(8) Multiplexing and transmitting a plurality of spatially multiplexed streams from one access point to one communication terminal enables a data transmission amount per unit time to be increased.

INDUSTRIAL APPLICABILITY

The technique disclosed in the present specification has been heretofore described in detail with reference to a specific embodiment. However, it is obvious that various modifications and substitutions to the embodiment will occur to those skilled in the art without departing from the gist of the technique disclosed in the present specification.

While the technique disclosed in the present specification can be applied to, for example, a wireless network based on a wireless LAN standard such as IEEE 801.11, applications of the technique are not limited thereto. The technique disclosed in the present specification can be similarly applied to various types of wireless systems in which adjacent access points or base stations are capable of operating in coordination.

To summarize, the technique disclosed in the present specification has been described by way of exemplification and the contents of the description of the present specification should not be restrictively interpreted. The appended claims should be taken into consideration in order to determine the gist of the technique disclosed in the present specification.

The technique disclosed in the present specification can also be configured as follows.

(1) A communication apparatus that operates as an access point, the communication apparatus including:
a communicating unit configured to transmit and receive wireless signals; and
a control unit configured to control communication operations in the communicating unit, the communication operations including a communication operation for sharing data to be simultaneously transmitted to a single communication terminal between adjacent access points and a communication operation for recognizing that sharing of the data has been completed.

The communication apparatus according to (1) described above, wherein the communicating unit is capable of transmitting and receiving a wireless signal in which a plurality of pieces of data are configured as a multiplexed stream, and the control unit is configured to perform control when transmitting the shared data simultaneously with the adjacent access points so as to multiplex the shared data with a transmission stream addressed to another communication apparatus and transmit the shared data as a multi-user multiplexed stream.

(2-1) The communication apparatus according to (1) described above, wherein the communicating unit is capable of transmitting and receiving a wireless signal in which a plurality of pieces of data are configured as a spatially multiplexed stream, and
the control unit is configured to perform control when transmitting the shared data simultaneously with the adjacent access points so as to multiplex the shared data with a transmission stream addressed to another communication apparatus and transmit the shared data as a multi-user spatially multiplexed stream.

(3) The communication apparatus according to (1) or (2) described above, wherein the communicating unit is capable of transmitting and receiving a wireless signal in which a plurality of pieces of data are configured as a multiplexed stream, and
the control unit is configured to perform control so as to multiplex and communicate data to be shared between the adjacent access points as a multiplexed stream.

(3-1) The communication apparatus according to any one of (1) to (3) described above, wherein
the communicating unit is capable of transmitting and receiving a wireless signal in which a plurality of pieces of data are configured as a spatially multiplexed stream, and
the control unit is configured to perform control so as to multiplex and communicate data to be shared between the adjacent access points as a spatially multiplexed stream.

(4) The communication apparatus according to any one of (1) to (3) described above, wherein
the control unit is configured to perform control so as to perform a communication operation for sharing the data between the adjacent access points during a time section in which the single communication terminal is incapable of communication.

(5) The communication apparatus according to any one of (1) to (4) described above, wherein
the control unit is configured to perform control so as to perform communication for sharing the data between the adjacent access points using a coding scheme or a modulation scheme that enables high-speed transmission.

(6) The communication apparatus according to any one of (1) to (5) described above, wherein
the control unit is configured to notify the adjacent access points that sharing of the data or simultaneous transmission of the shared data to the single communication terminal is to be performed by transmitting a predetermined initiation frame.

(7) The communication apparatus according to any one of (1) to (5) described above, wherein
the control unit is configured to recognize that sharing of the data or simultaneous transmission of the shared data to the single communication terminal is to be performed based on receiving a predetermined initiation frame from the adjacent access points.

(8) The communication apparatus according to (6) or (7) described above, wherein
the initiate frame includes information related to access points to simultaneously transmit the data to be shared.

(9) The communication apparatus according to (8) described above, wherein
the initiate frame further includes at least one of information related to a transmission timing of the data to be shared, information related to a coding scheme or a modulation scheme during transmission of the data to be shared, and information related to a channel for transmitting the data to be shared.

(10) The communication apparatus according to any one of (1) to (9) described above, wherein
the control unit is configured to control a transmission timing of the data to be shared based on transmission of a predetermined trigger frame or reception of the trigger frame from the adjacent access points.

(11) The communication apparatus according to any one of (1) to (10) described above, wherein
the control unit is configured to recognize sharing of the data based on communication of a predetermined grant frame between the adjacent access points.

(12) The communication apparatus according to (11) described above, wherein the control unit is configured to perform control so as to send back the grant frame to the adjacent access point having transmitted the data to be shared.

(13) The communication apparatus according to (11) described above, wherein
the control unit is configured to control reception processing of the grant frame having been sent back from the adjacent access point to be a reception destination of the data to be shared.

(14) The communication apparatus according to any one of (11) to (13) described above, wherein
the grant frame includes at least one of information related to the single communication terminal, information related to the number of multiplexed transmissions when transmitting the data to be shared, and a communication parameter upon transmission of the data to be shared.

(15) The communication apparatus according to (13) described above, wherein the communicating unit is capable of transmitting and receiving a wireless signal in which a plurality of pieces of data are configured as a multiplexed stream, and
the grant frame includes at least one of information related to the number of multiplexed transmissions when transmitting the data to be shared and a communication parameter upon transmission of the data to be shared.

(16) The communication apparatus according to any one of (1) to (15) described above, wherein
the control unit is configured to discard the data to be shared based on completion of reception of the data to be shared by the single communication terminal.

(17) The communication apparatus according to (2) described above, wherein the control unit is configured to control multiplexed transmission of data based on the number of multiplexed streams that can be received by the single communication terminal and the other communication terminal.

(18) A communication method in an access point, the communication method including the steps of:
sharing data to be simultaneously transmitted to a single communication terminal between adjacent access points;
recognizing that sharing of the data has been completed; and transmitting the shared data.

(19) A communication apparatus that operates as a communication terminal to be connected to an access point, the communication apparatus including:
a communicating unit configured to transmit and receive wireless signals; and
a control unit configured to control communication operations in the communicating unit, the communication operations including an operation for recognizing that a same piece of data has been simultaneously transmitted from a plurality of access points based on a reception of a predetermined frame from the access point.

(19-1) The communication apparatus according to (19) described above, wherein
the predetermined frame is a grant frame that includes information related to sharing of the same piece of data between the adjacent access points.

(19-2) The communication apparatus according to (19-1) described above, wherein
the grant frame includes at least one of information related to the communication terminal, information related to the number of multiplexed transmissions when transmitting the data to be shared, and a communication parameter upon transmission of the data to be shared.

(19-3) The communication apparatus according to (19) described above, wherein the communicating unit is capable of transmitting and receiving a wireless signal in which a plurality of pieces of data are configured as a multiplexed stream, and the control unit is configured to control reception of a multi-user multiplexed stream in which a stream of the same piece of data and a transmission stream addressed to another communication apparatus are multiplexed from the plurality of access points.

(20) A communication method in a communication terminal to be connected to an access point, the communication method including the steps of:
receiving a predetermined frame from an access point;
recognizing that a same piece of data has been simultaneously transmitted from a plurality of access points based on the received predetermined frame;
and
receiving the same piece of data that is simultaneously transmitted from the plurality of access points.

REFERENCE SIGNS LIST

2000 Communication apparatus
2001 Internet connection module
2002 Information input module
2003 Device control unit
2004 Information output module
2005 Wireless communication module
2101 Interface
2102 Transmission buffer
2103 Network managing unit
2104 Transmission frame constructing unit
2105 Reception data constructing unit
2106 Reception buffer
2107 Coordinate communication managing unit
2108 Spatially multiplexed transmission processing unit
2109 Spatially multiplexed reception processing unit
2110 Management information generating unit
2111 Management information processing unit
2112 Wireless transmission processing unit
2113 Transmission power control unit
1014 Transmission/reception antenna control unit
2115 Detection threshold control unit
2116 Wireless reception processing unit

The invention claimed is:

1. A first communication apparatus that operates as an access point, the first communication apparatus comprising:
    circuitry configured to:
        transmit and receive wireless signals;
        control a first communication operation of a plurality of communication operations to share data between adjacent access points during a time section in which a first communication terminal receives an interference signal from an interference source, wherein
            the adjacent access points are adjacent to the first communication apparatus, and,
            the share data is transmitted simultaneously by the first communication apparatus and the adjacent access points; and
        control a second communication operation of the plurality of communication operations to recognize that the transmission of the share data has been completed.

2. The first communication apparatus according to claim 1, wherein
    the circuitry is further configured to:
        transmit and receive a wireless signal in which a plurality of pieces of data are configured as a multiplexed stream, wherein the plurality of pieces of data includes the data;
        multiplex, when transmitting the share data simultaneously with the adjacent access points, the share data with a transmission stream addressed to a second communication apparatus; and
        transmit the share data as a multi-user multiplexed stream.

3. The first communication apparatus according to claim 1, wherein
    the circuitry communicating unit is further configured to:
        transmit and receive a wireless signal in which a plurality of pieces of data are configured as a multiplexed stream, wherein the plurality of pieces of data includes the data; and
        multiplex and communicate the data to be shared between the adjacent access points as the multiplexed stream.

4. The first communication apparatus according to claim 1, wherein the circuitry is further configured to control the first communication operation to share the data between the adjacent access points using one of a coding scheme or a modulation scheme that enables high-speed transmission.

5. The first communication apparatus according to claim 1, wherein the circuitry is further configured to notify the adjacent access points that at least one the sharing of the data or the simultaneous transmission of the share data to the first communication terminal is to be performed by a transmission of a specific initiation frame.

6. The first communication apparatus according to claim 1, wherein the circuitry is further configured to recognize that at least one of the sharing of the data or simultaneous transmission of the share data to the first communication terminal is to be performed based on a reception of a specific initiation frame from the adjacent access points.

7. The first communication apparatus according to claim 5, wherein the specific initiation frame includes information associated with the adjacent access points to simultaneously transmit the data to be shared.

8. The first communication apparatus according to claim 7, wherein the specific initiation frame further includes at least one of information associated with a transmission timing of the data to be shared, information associated with one of a coding scheme or a modulation scheme during the transmission of the data to be shared, or information associated with a channel for transmitting the data to be shared.

9. The first communication apparatus according to claim 1, wherein the circuitry is further configured to control a transmission timing of the data to be shared based on at least one of a transmission of a specific trigger frame or a reception of the specific trigger frame from the adjacent access points.

10. The first communication apparatus according to claim 1, wherein the circuitry is further configured to recognize the sharing of the data based on a communication of a specific grant frame between the adjacent access points.

11. The first communication apparatus according to claim 10, wherein the circuitry is further configured to send back the specific grant frame to an adjacent access point of the adjacent access points which has transmitted the data to be shared.

12. The first communication apparatus according to claim 10, wherein
    the circuitry is further configured to control a reception process of the specific grant frame, and
    the specific grant frame is sent back from the adjacent access point to be a reception destination of the data to be shared.

13. The first communication apparatus according to claim 10, wherein the specific grant frame includes at least one of information associated with the first communication terminal, information associated with a number of multiplexed transmissions when transmitting the data to be shared, and a communication parameter upon transmission of the data to be shared.

14. The first communication apparatus according to claim 10, wherein
    the circuitry is further configured to transmit and receive a wireless signal in which a plurality of pieces of data are configured as a multiplexed stream, wherein
        the pieces of data includes the data; and
        the specific grant frame includes at least one of information associated with a number of multiplexed transmissions when transmitting the data to be shared and a communication parameter upon transmission of the data to be shared.

15. The first communication apparatus according to claim 1, wherein
    the circuitry is further configured to discard the data to be shared based on completion of reception of the data to be shared by the first communication terminal.

16. The first communication apparatus according to claim 2, wherein
    the circuitry is further configured to control multiplexed transmission of the data based on a number of multiplexed streams that can be received by the first communication terminal and a second communication terminal, and
    the number of multiplexed streams include the multiplexed stream.

17. A communication method in a communication apparatus which is an access point, the communication method comprising:
    transmitting and receiving wireless signals;
    controlling a first communication operation of a plurality of communication operations to share data between adjacent access points during a time section in which a first communication terminal receives an interference signal from an interference source, wherein the adjacent access points are adjacent to the communication apparatus, and,
  the share data is transmitted simultaneously by the communication apparatus and the adjacent access points;
recognizing that the transmission of the share data has been completed; and
transmitting the share data.

\* \* \* \* \*